US009929818B2

United States Patent
Holden et al.

(10) Patent No.: US 9,929,818 B2
(45) Date of Patent: *Mar. 27, 2018

(54) METHODS AND SYSTEMS FOR SELECTION OF UNIONS OF VECTOR SIGNALING CODES FOR POWER AND PIN EFFICIENT CHIP-TO-CHIP COMMUNICATION

(71) Applicant: Kandou Lab, S.A., Lausanne (CH)

(72) Inventors: Brian Holden, Sereno, CA (US); Amin Shokrollahi, Prevergenes (CH)

(73) Assignee: KANDOU BUS, S.A., Lausanne (CH)

( * ) Notice: Subject to any disclaimer, the term of this patent is extended or adjusted under 35 U.S.C. 154(b) by 277 days.

This patent is subject to a terminal disclaimer.

(21) Appl. No.: 14/793,448

(22) Filed: Jul. 7, 2015

(65) Prior Publication Data

US 2015/0381346 A1    Dec. 31, 2015

Related U.S. Application Data

(63) Continuation of application No. 13/603,107, filed on Sep. 4, 2012, now Pat. No. 9,077,386.

(51) Int. Cl.
*H04B 17/364*    (2015.01)
*H04B 5/00*    (2006.01)
(Continued)

(52) U.S. Cl.
CPC ............ *H04B 17/364* (2015.01); *H04B 3/00* (2013.01); *H04B 3/02* (2013.01); *H04B 5/0031* (2013.01);
(Continued)

(58) Field of Classification Search
CPC .......... H04B 17/364; H04B 3/00; H04B 3/02; H04B 5/0031; H04B 5/0081;
(Continued)

(56) References Cited

U.S. PATENT DOCUMENTS 668,687 A    2/1901    Mayer
780,883 A    1/1905    Hinchman
(Continued)

FOREIGN PATENT DOCUMENTS

| CN | 101478286 | 7/2009 |
|---|---|---|
| EP | 2039221 B1 | 3/2009 |
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion of the International Searching Authority, dated Nov. 5, 2012, in International Patent Application S.N. PCT/EP2012/052767, 7 pages.

(Continued)

*Primary Examiner* — Nader Bolourchi
(74) *Attorney, Agent, or Firm* — Invention Mine, LLC

(57) ABSTRACT

Methods and systems are described for communication of data over a communications bus at high speed and high pin efficiency, with good resilience to common mode and other noise. Pin efficiencies of 100% may be achieved even for bus widths of four or fewer wires. Information to be transmitted is encoded as words of a vector signaling code, each word comprising multiple values transmitted as a group over the communications bus. Subsets of the vector signaling code have distinct group characteristics, which are discernable on transmission and are used to facilitate decoding on reception.

20 Claims, 14 Drawing Sheets

(51) Int. Cl.

| | | |
|---|---|---|
| *H04L 25/49* | (2006.01) | |
| *H04B 3/00* | (2006.01) | |
| *H04L 25/03* | (2006.01) | |
| *H04L 25/02* | (2006.01) | |
| *H04L 1/06* | (2006.01) | |
| *H04L 7/04* | (2006.01) | |
| *H04L 25/08* | (2006.01) | |
| *H04B 3/02* | (2006.01) | |

(52) U.S. Cl.
CPC ......... *H04B 5/0081* (2013.01); *H04L 1/0643* (2013.01); *H04L 7/043* (2013.01); *H04L 7/048* (2013.01); *H04L 25/028* (2013.01); *H04L 25/0268* (2013.01); *H04L 25/0272* (2013.01); *H04L 25/0292* (2013.01); *H04L 25/03019* (2013.01); *H04L 25/08* (2013.01); *H04L 25/4925* (2013.01)

(58) Field of Classification Search
CPC ............... H04L 1/0643; H04L 25/0268; H04L 25/0272; H04L 25/028; H04L 25/0292; H04L 25/03019; H04L 7/043; H04L 7/048
USPC ........................................................ 375/257
See application file for complete search history.

(56) References Cited

U.S. PATENT DOCUMENTS

| | | |
|---|---|---|
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara et al. |
| 4,181,967 A | 1/1980 | Nash et al. |
| 4,206,316 A | 6/1980 | Burnsweig et al. |
| 4,276,543 A | 6/1981 | Miller |
| 4,486,739 A | 12/1984 | Franaszeck et al. |
| 4,499,550 A | 2/1985 | Ray et al. |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 5,017,924 A | 5/1991 | Guiberteau |
| 5,053,974 A | 10/1991 | Penz |
| 5,166,956 A | 11/1992 | Baltus et al. |
| 5,168,509 A | 12/1992 | Nakamura et al. |
| 5,266,907 A | 11/1993 | Dacus |
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,412,689 A | 5/1995 | Chan et al. |
| 5,449,895 A | 9/1995 | Hecht |
| 5,459,465 A | 10/1995 | Kagey |
| 5,461,379 A | 10/1995 | Weinman |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss et al. |
| 5,626,651 A | 5/1997 | Dullien |
| 5,629,651 A | 5/1997 | Mizuno |
| 5,659,353 A | 8/1997 | Kostreski et al. |
| 5,727,006 A | 3/1998 | Dreyer |
| 5,748,948 A | 5/1998 | Yu |
| 5,802,356 A | 9/1998 | Gaskins |
| 5,825,808 A | 10/1998 | Hershey et al. |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattscneider |
| 5,982,954 A | 11/1999 | Delen |
| 5,999,016 A | 11/1999 | Perino |
| 6,005,895 A | 12/1999 | Perino et al. |
| 6,084,883 A | 7/2000 | Norrell et al. |
| 6,172,634 B1 | 1/2001 | Leonowich et al. |
| 6,175,230 B1 | 1/2001 | Hamblin et al. |
| 6,232,908 B1 | 5/2001 | Nakaigawa |
| 6,278,740 B1 | 8/2001 | Nordyke |
| 6,316,987 B1 | 11/2001 | Dally |
| 6,346,907 B1 | 2/2002 | Dacy |
| 6,359,931 B1 | 3/2002 | Perino et al. |
| 6,378,073 B1 | 4/2002 | Davis |
| 6,398,359 B1 | 6/2002 | Silverbrook |
| 6,404,820 B1 | 6/2002 | Postol |
| 6,404,920 B1 | 6/2002 | Postol |
| 6,417,737 B1 | 7/2002 | Moloudi et al. |
| 6,433,800 B1 | 8/2002 | Holtz |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino et al. |
| 6,509,773 B2 | 1/2003 | Buchwald |
| 6,522,699 B1 | 2/2003 | Anderson |
| 6,556,628 B1 | 4/2003 | Poulton et al. |
| 6,563,382 B1 | 5/2003 | Yang et al. |
| 6,621,427 B2 | 9/2003 | Greenstreet |
| 6,624,699 B2 | 9/2003 | Yin |
| 6,650,638 B1 | 11/2003 | Walker et al. |
| 6,661,355 B2 | 12/2003 | Cornelius et al. |
| 6,664,355 B2 | 12/2003 | Kim |
| 6,766,342 B2 | 7/2004 | Kechriotis |
| 6,839,429 B1 | 1/2005 | Gaikwald et al. |
| 6,865,234 B1 | 3/2005 | Agazzi |
| 6,865,236 B1 | 3/2005 | Terry |
| 6,876,317 B2 | 4/2005 | Sankaran |
| 6,954,492 B1 | 10/2005 | Williams |
| 6,972,701 B2 | 12/2005 | Jansson |
| 6,990,138 B2 | 1/2006 | Bejjani |
| 6,991,038 B2 | 1/2006 | Bejjani et al. |
| 6,993,311 B2 | 1/2006 | Li |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,080,288 B2 | 7/2006 | Ferraiolo |
| 7,082,557 B2 | 7/2006 | Schauer |
| 7,085,153 B2 | 8/2006 | Ferrant et al. |
| 7,127,003 B2 | 10/2006 | Rajan |
| 7,142,612 B2 | 11/2006 | Horowitz et al. |
| 7,142,865 B2 | 11/2006 | Tsai |
| 7,167,019 B2 | 1/2007 | Broyde et al. |
| 7,180,949 B2 | 2/2007 | Kleveland et al. |
| 7,184,483 B2 | 2/2007 | Rajan |
| 7,199,728 B2 | 4/2007 | Dally |
| 7,231,558 B2 | 6/2007 | Gentieu |
| 7,269,130 B2 | 9/2007 | Pitio |
| 7,335,976 B2 | 2/2008 | Chen |
| 7,336,112 B1 | 2/2008 | Sha |
| 7,346,819 B2 | 3/2008 | Bansal |
| 7,356,213 B1 | 4/2008 | Cunningham et al. |
| 7,358,869 B1 | 4/2008 | Chiarulli et al. |
| 7,362,130 B2 | 4/2008 | Broyde et al. |
| 7,362,697 B2 | 4/2008 | Becker |
| 7,366,942 B2 | 4/2008 | Lee |
| 7,372,390 B2 | 5/2008 | Yamada |
| 7,389,333 B2 | 6/2008 | Moore et al. |
| 7,397,302 B2 | 7/2008 | Bardsley |
| 7,400,276 B1 | 7/2008 | Sotiriadis |
| 7,428,273 B2 | 9/2008 | Foster |
| 7,539,532 B2 | 5/2009 | Tran |
| 7,620,116 B2 | 11/2009 | Bessios |
| 7,633,850 B2 | 12/2009 | Ahn |
| 7,643,588 B2 | 1/2010 | Visalli |
| 7,650,525 B1 | 1/2010 | Chang |
| 7,656,321 B2 | 2/2010 | Wang |
| 7,697,915 B2 | 4/2010 | Behzad |
| 7,698,088 B2 | 4/2010 | Sul |
| 7,706,524 B2 | 4/2010 | Zerbe |
| 7,746,764 B2 | 6/2010 | Rawlins et al. |
| 7,768,312 B2 | 8/2010 | Hirose |
| 7,787,572 B2 | 8/2010 | Scharf et al. |

(56) References Cited

U.S. PATENT DOCUMENTS

| | | | |
|---|---|---|---|
| 7,808,456 B2 | 10/2010 | Chen | |
| 7,841,909 B2 | 11/2010 | Murray | |
| 7,869,497 B2 | 1/2011 | Benvenuto | |
| 7,869,546 B2 | 1/2011 | Tsai | |
| 7,882,413 B2 | 2/2011 | Chen et al. | |
| 7,933,770 B2 | 4/2011 | Kruger et al. | |
| 8,000,664 B2 | 8/2011 | Khorram | |
| 8,030,999 B2 | 10/2011 | Chatterjee | |
| 8,064,535 B2 | 11/2011 | Wiley | |
| 8,091,006 B2 | 1/2012 | Prasad et al. | |
| 8,106,806 B2 | 1/2012 | Toyomura | |
| 8,149,906 B2 | 4/2012 | Saito | |
| 8,159,375 B2 | 4/2012 | Abbasafar | |
| 8,159,376 B2 | 4/2012 | Abbasfar | |
| 8,199,849 B2 | 6/2012 | Oh | |
| 8,233,544 B2 | 7/2012 | Bao | |
| 8,253,454 B2 | 8/2012 | Lin | |
| 8,279,094 B2 | 10/2012 | Abbasfar | |
| 8,279,745 B2 | 10/2012 | Dent | |
| 8,289,914 B2 | 10/2012 | Li | |
| 8,295,250 B2 | 10/2012 | Gorokhov | |
| 8,295,336 B2 | 10/2012 | Lutz | |
| 8,310,389 B1 | 11/2012 | Chui | |
| 8,341,492 B2 | 12/2012 | Shen | |
| 8,359,445 B2 | 1/2013 | Ware | |
| 8,406,315 B2 | 3/2013 | Tsai | |
| 8,406,316 B2 | 3/2013 | Sugita | |
| 8,429,492 B2 | 4/2013 | Yoon | |
| 8,429,495 B2 | 4/2013 | Przybylski | |
| 8,437,440 B1 | 5/2013 | Zhang | |
| 8,442,099 B1 | 5/2013 | Sederat | |
| 8,442,210 B2 | 5/2013 | Zerbe | |
| 8,443,223 B2 | 5/2013 | Abbasfar | |
| 8,462,891 B2 | 6/2013 | Kizer et al. | |
| 8,498,368 B1 | 7/2013 | Husted | |
| 8,520,493 B2 | 8/2013 | Goulahsen | |
| 8,547,272 B2 | 10/2013 | Nestler et al. | |
| 8,578,246 B2 | 11/2013 | Mittelholzer | |
| 8,588,280 B2 | 11/2013 | Oh et al. | |
| 8,593,305 B1 | 11/2013 | Tajalli et al. | |
| 8,602,643 B2 | 12/2013 | Gardiner | |
| 8,604,879 B2 | 12/2013 | Mourant | |
| 8,620,166 B2 | 12/2013 | Guha | |
| 8,638,241 B2 | 1/2014 | Sudhakaran | |
| 8,643,437 B2 | 2/2014 | Chiu | |
| 8,649,445 B2 * | 2/2014 | Cronie | H04L 1/0041 331/25 |
| 8,649,460 B2 | 2/2014 | Ware | |
| 8,649,556 B2 | 2/2014 | Cronie | |
| 8,649,840 B2 | 2/2014 | Ware et al. | |
| 8,674,861 B2 | 3/2014 | Matsuno | |
| 8,687,968 B2 | 4/2014 | Nosaka | |
| 8,718,184 B1 | 5/2014 | Cronie | |
| 8,755,426 B1 | 6/2014 | Cronie | |
| 8,780,687 B2 | 7/2014 | Clausen | |
| 8,782,578 B2 | 7/2014 | Tell | |
| 8,831,440 B2 | 9/2014 | Yu | |
| 8,879,660 B1 | 11/2014 | Peng | |
| 8,898,504 B2 | 11/2014 | Baumgartner | |
| 8,938,171 B2 | 1/2015 | Tang | |
| 8,949,693 B2 | 2/2015 | Ordentlich | |
| 8,951,072 B2 | 2/2015 | Hashim | |
| 8,989,317 B1 | 3/2015 | Holden | |
| 9,036,764 B1 | 5/2015 | Hossain | |
| 9,059,816 B1 | 6/2015 | Simpson | |
| 9,069,995 B1 | 6/2015 | Cronie | |
| 9,077,386 B1 | 7/2015 | Holden | |
| 9,083,576 B1 | 7/2015 | Hormati | |
| 9,093,791 B2 | 7/2015 | Liang | |
| 9,100,232 B1 | 8/2015 | Hormati | |
| 9,148,087 B1 | 9/2015 | Tajalli | |
| 9,152,495 B2 | 10/2015 | Losh | |
| 9,178,503 B2 | 11/2015 | Hsieh | |
| 9,183,085 B1 | 11/2015 | Northcott | |
| 9,281,785 B2 | 3/2016 | Sjoland | |
| 9,288,082 B1 | 3/2016 | Ulrich | |
| 9,288,089 B2 | 3/2016 | Cronie | |
| 9,292,716 B2 | 3/2016 | Winoto | |
| 9,300,503 B1 | 3/2016 | Holden | |
| 9,306,621 B2 | 4/2016 | Zhang | |
| 9,331,962 B2 | 5/2016 | Lida | |
| 9,362,974 B2 | 6/2016 | Fox | |
| 9,363,114 B2 | 6/2016 | Shokrollahi | |
| 9,374,250 B1 | 6/2016 | Musah | |
| 9,401,828 B2 | 7/2016 | Cronie | |
| 9,432,082 B2 | 8/2016 | Ulrich | |
| 9,432,298 B1 | 8/2016 | Smith | |
| 9,444,654 B2 | 9/2016 | Hormati | |
| 9,455,744 B2 | 9/2016 | George | |
| 9,455,765 B2 | 9/2016 | Schumacher | |
| 9,461,862 B2 | 10/2016 | Holden | |
| 9,509,437 B2 | 11/2016 | Shokrollahi | |
| 9,544,015 B2 | 1/2017 | Ulrich | |
| 9,667,379 B2 | 5/2017 | Cronie | |
| 2001/0055344 A1 | 12/2001 | Lee et al. | |
| 2002/0034191 A1 | 3/2002 | Shattil | |
| 2002/0057292 A1 | 5/2002 | Robb | |
| 2002/0057592 A1 | 5/2002 | Robb | |
| 2002/0154633 A1 | 10/2002 | Shin | |
| 2002/0163881 A1 | 11/2002 | Dhong | |
| 2002/0174373 A1 | 11/2002 | Chang | |
| 2002/0181607 A1 | 12/2002 | Izumi | |
| 2003/0016770 A1 | 1/2003 | Trans | |
| 2003/0071745 A1 | 4/2003 | Greenstreet | |
| 2003/0085763 A1 | 5/2003 | Schrodinger | |
| 2003/0086366 A1 | 5/2003 | Branlund | |
| 2003/0105908 A1 | 6/2003 | Perino et al. | |
| 2003/0146783 A1 | 8/2003 | Brandy et al. | |
| 2003/0174023 A1 | 9/2003 | Miyasita | |
| 2003/0227841 A1 | 12/2003 | Tateishi et al. | |
| 2004/0003336 A1 | 1/2004 | Cypher | |
| 2004/0003337 A1 | 1/2004 | Cypher | |
| 2004/0027185 A1 | 2/2004 | Fiedler | |
| 2004/0057525 A1 | 3/2004 | Rajan et al. | |
| 2004/0086059 A1 | 5/2004 | Eroz et al. | |
| 2004/0146117 A1 | 7/2004 | Subramaniam | |
| 2004/0155802 A1 | 8/2004 | Lamy | |
| 2004/0156432 A1 | 8/2004 | Hidaka | |
| 2004/0161019 A1 | 8/2004 | Raghavan | |
| 2004/0169529 A1 | 9/2004 | Afghahi | |
| 2005/0057379 A1 | 3/2005 | Jansson | |
| 2005/0063493 A1 | 3/2005 | Foster | |
| 2005/0134380 A1 | 6/2005 | Nairn | |
| 2005/0135182 A1 | 6/2005 | Perino et al. | |
| 2005/0152385 A1 | 7/2005 | Cioffi | |
| 2005/0174841 A1 | 8/2005 | Ho | |
| 2005/0286643 A1 | 12/2005 | Ozawa et al. | |
| 2006/0097786 A1 | 5/2006 | Su | |
| 2006/0103463 A1 | 5/2006 | Lee | |
| 2006/0115027 A1 | 6/2006 | Srebranig | |
| 2006/0120486 A1 | 6/2006 | Visalli | |
| 2006/0126751 A1 | 6/2006 | Bessios | |
| 2006/0133538 A1 | 6/2006 | Stojanovic | |
| 2006/0159005 A1 | 7/2006 | Rawlins | |
| 2007/0002954 A1 | 1/2007 | Cornelius | |
| 2007/0030796 A1 | 2/2007 | Green | |
| 2007/0121716 A1 | 5/2007 | Nagarajan | |
| 2007/0188367 A1 | 8/2007 | Yamada | |
| 2007/0204205 A1 | 8/2007 | Niu | |
| 2007/0260965 A1 | 11/2007 | Schmidt et al. | |
| 2007/0263711 A1 | 11/2007 | Kramer et al. | |
| 2007/0265533 A1 | 11/2007 | Tran | |
| 2007/0283210 A1 | 12/2007 | Prasad | |
| 2008/0007367 A1 | 1/2008 | Kim | |
| 2008/0012598 A1 | 1/2008 | Mayer | |
| 2008/0104374 A1 | 5/2008 | Mohamed | |
| 2008/0159448 A1 | 7/2008 | Dankwa | |
| 2008/0169846 A1 | 7/2008 | Lan et al. | |
| 2008/0192621 A1 | 8/2008 | Suehiro | |
| 2008/0273623 A1 | 11/2008 | Chung et al. | |
| 2008/0284524 A1 | 11/2008 | Kushiyama | |
| 2008/0317188 A1 | 12/2008 | Staszewski | |
| 2009/0059782 A1 | 3/2009 | Cole | |
| 2009/0092196 A1 | 4/2009 | Okunev | |

(56) References Cited

U.S. PATENT DOCUMENTS

| | | |
|---|---|---|
| 2009/0132758 A1 | 5/2009 | Jiang |
| 2009/0154500 A1 | 6/2009 | Diab et al. |
| 2009/0163612 A1 | 6/2009 | Lee et al. |
| 2009/0185636 A1 | 7/2009 | Palotai et al. |
| 2009/0195281 A1 | 8/2009 | Tamura |
| 2009/0212861 A1 | 8/2009 | Lim et al. |
| 2009/0228767 A1 | 9/2009 | Oh et al. |
| 2009/0257542 A1 | 10/2009 | Evans et al. |
| 2009/0316730 A1 | 12/2009 | Feng |
| 2009/0323864 A1 | 12/2009 | Tired |
| 2010/0023838 A1 | 1/2010 | Shen |
| 2010/0081451 A1 | 4/2010 | Mueck |
| 2010/0104047 A1 | 4/2010 | Chen et al. |
| 2010/0180143 A1 | 7/2010 | Ware et al. |
| 2010/0205506 A1 | 8/2010 | Hara |
| 2010/0215087 A1 | 8/2010 | Tsai |
| 2010/0215112 A1 | 8/2010 | Tsai |
| 2010/0235673 A1 | 9/2010 | Abbasfar |
| 2010/0296550 A1 | 11/2010 | Abou Rjeily |
| 2010/0296556 A1 | 11/2010 | Rave |
| 2010/0309964 A1* | 12/2010 | Oh ............... G06F 13/4243 375/219 |
| 2011/0014865 A1 | 1/2011 | Seo |
| 2011/0051854 A1 | 3/2011 | Kizer et al. |
| 2011/0072330 A1 | 3/2011 | Kolze |
| 2011/0084737 A1 | 4/2011 | Oh et al. |
| 2011/0127990 A1 | 6/2011 | Wilson et al. |
| 2011/0235501 A1 | 9/2011 | Goulahsen |
| 2011/0268225 A1* | 11/2011 | Cronie ............ H04L 25/0272 375/296 |
| 2011/0299555 A1 | 12/2011 | Cronie et al. |
| 2011/0302478 A1 | 12/2011 | Cronie et al. |
| 2011/0317559 A1 | 12/2011 | Kern et al. |
| 2012/0063291 A1 | 3/2012 | Hsueh |
| 2012/0152901 A1 | 6/2012 | Nagorny |
| 2012/0161945 A1 | 6/2012 | Single |
| 2012/0213299 A1 | 8/2012 | Cronie |
| 2012/0257683 A1 | 10/2012 | Schwager |
| 2013/0010892 A1 | 1/2013 | Cronie |
| 2013/0013870 A1 | 1/2013 | Cronie |
| 2013/0051162 A1 | 2/2013 | Amirkhany et al. |
| 2013/0114519 A1 | 5/2013 | Gaal |
| 2013/0147553 A1 | 6/2013 | Iwamoto |
| 2013/0188656 A1 | 7/2013 | Ferraiolo |
| 2013/0195155 A1 | 8/2013 | Pan |
| 2013/0259113 A1 | 10/2013 | Kumar |
| 2013/0315501 A1 | 11/2013 | Atanassov |
| 2013/0346830 A1 | 12/2013 | Ordentlich |
| 2014/0177645 A1 | 6/2014 | Cronie |
| 2014/0226455 A1 | 8/2014 | Schumacher |
| 2014/0254730 A1 | 9/2014 | Kim et al. |
| 2015/0010044 A1 | 1/2015 | Zhang |
| 2015/0078479 A1 | 3/2015 | Whitby-Stevens |
| 2015/0146771 A1 | 5/2015 | Walter |
| 2015/0222458 A1 | 8/2015 | Hormati |
| 2015/0249559 A1 | 9/2015 | Shokrollahi |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |

OTHER PUBLICATIONS

International Search Report and Written Opinion of the International Searching Authority, dated Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

International Search Report for PCT/US2014/053563, dated Nov. 11, 2014, 2 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method for the Analysis of Signals: the Square-Wave Method, Mar. 2008, Revista de Matematica: Teoria y Aplicationes, pp. 09-129.

International Search Report and Written Opinion from PCT/US2014/034220 dated Aug. 21, 2014.

International Search Report and Written Opinion for PCT/US14/052986 dated Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallani, L., et al., "Transmission Time Analysis for the Parallel Asynchronous Communication Scheme", IEEE Tranactions on Computers, vol. 52, No. 5, May 2003, pp. 558-571.

International Search Report and Written Opinion for PCT/EP2012/052767 dated May 11, 2012.

International Search Report and Written Opinion for PCT/EP2011/059279 dated Sep. 22, 2011.

International Search Report and Written Opinion for PCT/EP2011/074219 dated Jul. 4, 2012.

Notification of Transmittal of the International Search Report and the Written Opinion of the International Searching Authority, or the Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Cheng, W., "Memory Bus Encoding for Low Power: A Tutorial", Quality Electronic Design, IEEE, International Symposium on Mar. 26-28, 2001, pp. 199-204, Piscataway, NJ.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Notification of Transmittal of International Search Report and the Written Opinion of the International Searching Authority, for PCT/US2015/018363, dated Jun. 18, 2015, 13 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

Grahame, J., "Vintage Analog Computer Kits," posted on Aug. 25, 2006 in Classic Computing, 2 pages, http.//www.retrothing.com/2006/08/classic_analog_.html.

Schneider, J., et al., "ELEC301 Project: Building an Analog Computer," Dec. 19, 1999, 8 pages, http://www.clear.rice.edu/elec301/Projects99/anlgcomp/.

(56) References Cited

OTHER PUBLICATIONS

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

"Introduction to: Analog Computers and the DSPACE System," Course Material ECE 5230 Spring 2008, Utah State University, www.coursehero.com, 12 pages.

Notification of Transmittal of the International Search Report and the Written Opinion of the International Searching Authority, or the Declaration, for PCT/US2014/015840, dated May 20, 2014. 11 pages.

Notification of Transmittal of the International Search Report and the Written Opinion of the International Searching Authority, or the Declaration, for PCT/US2014/043965, dated Oct. 22, 2014, 10 pages.

Notification of Transmittal of the International Search Report and the Written Opinion of the International Searching Authority, or the Declaration, dated Mar. 3, 2015, for PCT/U52014/066893, 9 pages.

International Preliminary Report on Patentability for PCT/U52014/015840, dated Aug. 11, 2015, 7 pages.

Jiang, A., et al., "Rank Modulation for Flash Memories", IEEE Transactions of Information Theory, Jun. 2006, vol. 55, No. 6, pp. 2659-2673.

Zouhair Ben-Neticha et al, "The streTched—Golay and other codes for high-SNR finite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.

Notification of Transmittal of the International Search Report and the Written Opinion of the International Searching Authority, or the Declaration, for PCT/US2015/039952, dated Sep. 23, 2015, 8 pages.

Notification of Transmittal of the International Search Report and the Written Opinion of the International Searching Authority, or the Declaration, for PCT/US2015/041161, dated Oct. 7, 2015, 8 pages.

Notification of Transmittal of the International Search Report and the Written Opinion of the International Searching Authority, or the Declaration, dated Feb. 15, 2017, 10 pages.

Notification of Transmittal of the International Search Report and the Written Opinion of the International Searching Authority, or the Declaration., for PCT/US17/14997, dated Apr. 7, 2017.

Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.

Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.

Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

* cited by examiner

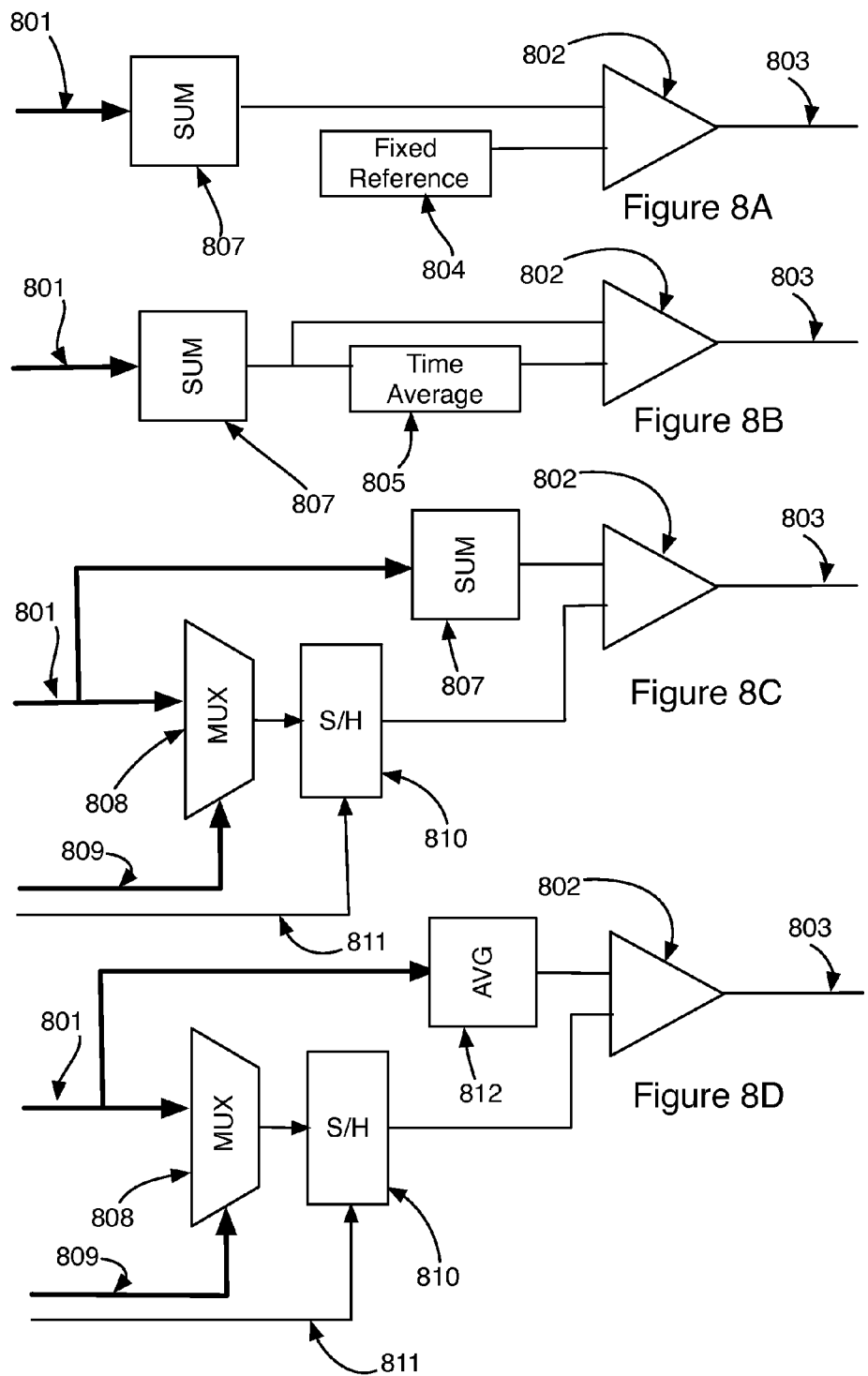

|  | Eye Opening | Highest F CM Reject | High F CM Reject | Mod F CM Reject | High F Ref Noise Reject | Mod F Ref Noise Reject |
|---|---|---|---|---|---|---|
| For comparison | | | | | | |
| PAM-4 | 1/3 of NRZ | good | Good | Good | good | good |
| 2b2w - The main data signal | 1/2 of NRZ | good | Good | Good | good | good |
| Four versions of receive sum detection | | | | | | |
| 2b2w - Fixed Reference vs. Sum | 1/2 of NRZ - NSL | bad | Bad | Bad | bad | bad |
| 2b2w - Dynamic ref vs. Sum | 1/2 of NRZ - NSL | bad | Bad | Good | bad | good |
| 2b2w - DF middle vs. Sum | 1/2 of NRZ - NSL | bad | Some | Some | good | good |
| 2b2w - DF middle vs. Sum/2 | 1/4 of NRZ - NSL/2 | bad | Good | Good | good | good |

2b2w 2 bits over 2 wires - a link using the code words {(+,0),(0,+),(-,0),(0,-)} grouped into two subcodes by their analog sums of +1 and -1, along with an analog sum circuit in the receiver that is used to discriminate between those subcodes.

DF Middle Decision Feedback Middle - use the results of the decision for the immediately previous bit to make a copy of the signal that was at the middle level in an analog sample-and-hold, and use that in a comparison with the analog sum signal.

Sum The analog sum of the values on the input wires.

Sum/2 The analog sum of the input wires divided by two (their average.) This can be used in the comparison with the stored Decision Feedback value in applications where common mode noise is the predominant noise source.

NSL Noise Sum Loss - the analog sum includes the combination of the noise on each wire,
which shrinks the available eye opening by a few dBs.

Figure 9

METHODS AND SYSTEMS FOR SELECTION OF UNIONS OF VECTOR SIGNALING CODES FOR POWER AND PIN EFFICIENT CHIP-TO-CHIP COMMUNICATION

This application is a continuation of U.S. application Ser. No. 13/603,107 filed Sep. 4, 2012, entitled "Methods and Systems for Selection of Unions of Vector Signaling Codes for Power and Pin-Efficient Chip-to-Chip Communication", which is hereby incorporated by reference in its entirety.

CROSS REFERENCES

The following references are herein incorporated by reference in their entirety for all purposes:

U.S. Patent Publication 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III"); and U.S. patent application Ser. No. 13/463,742, filed May 3, 2012, naming Harm Cronie and Amin Shokrollahi, entitled "Finite State Encoders and Decoders for Vector Signaling Codes" (hereafter called "Cronie IV").

The following additional references have been cited in this application and are herein incorporated by reference in their entirety for all purposes:

U.S. Pat. No. 6,556,628 B1 naming John W. Poulton, Stephen G. Tell and Robert E. Palmer entitled "Methods and systems for transmitting and receiving differential signals over a plurality of conductors" (hereafter called "Poulton");

U.S. Pat. No. 7,142,612 B2 naming Mark A. Horowitz, Scott C. Best and William F. Stonecypher entitled "Method and apparatus for multi-level signaling" (hereafter called "Horowitz"); and Healey, A., and Morgan, C., "A Comparison of 25 Gbps NRZ & PAM-4 Modulation used in Legacy & Premium Backplane Channels", DesignCon 2012 (hereafter called "Healey").

BACKGROUND

In communication systems, information may be transmitted from one physical location to another. Furthermore, it is typically desirable that the transport of this information is reliable, is fast and consumes a minimal amount of resources. One of the most common information transfer mediums is the serial communications link, which may be based on a single wire circuit relative to ground or other common reference, multiple such circuits relative to ground or other common reference, or multiple circuits used in relation to each other. An example of the latter utilizes Differential signaling (DS). Differential signaling operates by sending a signal on one wire and the opposite of that signal on a paired wire; the signal information is represented by the difference between the wires rather than their absolute values relative to ground or other fixed reference.

Differential signaling enhances the recoverability of the original signal at the receiver, over single ended signaling (SES), by cancelling crosstalk and other common-mode noise, but a side benefit of the technique is that the Simultaneous Switching Noise (SSN) transients generated by the two signals together is nearly zero; if both outputs are presented with an identical load, the transmit demand on its power supply will be constant, regardless of the data being sent. Any induced currents produced by terminating the differential lines in the receiver will similarly cancel out, minimizing noise induction into the receiving system.

There are a number of signaling methods that maintain the desirable properties of DS while increasing pin efficiency over DS. Many of these attempts operate on more than two wires simultaneously, using binary signals on each wire, but mapping information in groups of bits. For example, a communication system may, for some k>1, map each k information bits of the set $\{0,1\}^k$ to a set C comprising 2 k code words. Each code word may have the same length and if that length is less than 2 k, the pin efficiency would be greater than 0.5. For example, each component may be conveyed on one of N wires and have coordinates belonging to a set $\{a, -a\}$ so that each of the N wires carries a binary signal. For simple "repetitive" DS, the DS signals are applied independently to pairs of wires, so number of wires (N) would be 2 k. This mapping (with N<2 k) can provide higher pin efficiency relative to DS. Also, unlike "repetitive" SES, the set C does not contain all possible vectors of the given length.

Vector signaling is a method of signaling. With vector signaling, a plurality of signals on a plurality of wires is considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector may refer to the number of degrees of freedom of signals on the plurality of wires instead of exactly the number of wires in the plurality of wires.

With binary vector signaling, each component takes on a coordinate value (or "coordinate", for short) that is one of two possible values. As an example, eight SES wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. Stated mathematically, binary vector signaling maps the information bits of the set $\{0,1\}$k for some k>1 to a code, C, comprising 2 k vectors. Each vector may have the same dimension, N, and that dimension (i.e., number of components) may be greater than k but less than 2 k (resulting in a the pin efficiency above 0.5). A "binary vector signaling code" refers to a mapping and/or set of rules to map information bits to binary vectors.

With non-binary vector signaling, each component has a coordinate value that is a selection from a set of more than two possible values. A "non-binary vector signaling code" refers to a mapping and/or set of rules to map information bits to non-binary vectors. Stated mathematically, given an input word size, k>1, given a finite set, S, called the alphabet, of three or more values (possibly corresponding to, or representable by, values that may correspond to physical quantities as explained herein, wherein the values are typically real numbers), and given a vector dimensionality, N, non-binary vector signaling is a mapping between $\{0,1\}k$ and a vector set, C, where C is a subset of $S^N$. In specific instances, there is no proper subset T of S such that C is a subset of $T^N$, i.e., over the code C, there is at least one component (coordinate position) in which each of the values of finite set S appears. In this case, S may be called the "true alphabet" of the code. For S being a finite set of three values, that means that there will be at least one coordinate position for which at least three code words all have different values. Any suitable subset of a vector signaling code denotes a "subcode" of that code. Such a subcode may be a vector signaling code.

Some vector signaling methods are described in Cronie I, Cronie II, Cronie III, and Cronie IV. For example:
(1) Orthogonal differential vector signaling is described, wherein the code C is obtained as the Hadamard transform images of vectors of length k with coordinates in the set $\{+1, 1\}$;
(2) Permutation modulation codes are described, wherein the code C is obtained by taking the set of all vectors obtained from all permutations of a fixed vector; and
(3) Sparse signaling codes are described, wherein the code C is the set of all vectors obtained from all permutations of a fixed vector in which many coordinates are zero (or a fixed number).

While non-binary vector signaling methods can provide substantial improvements regarding the tradeoff of pin efficiency, power efficiency and noise resilience as compared to traditional signaling methods, there are some applications wherein additional improvements are possible.

BRIEF SUMMARY

In accordance with at least one embodiment of the invention, processes and apparatuses provide for transmitting data over physical channels such that the signals transmitted are resilient to common mode noise, do not require a common reference at the transmission and reception points, and can produce a pin-efficiency of 100% with relatively low power dissipation for encoding and decoding. Corresponding decoders at reception points are also disclosed.

In a specific embodiment, information is transmitted over a communication bus by receiving a first set of signals representing the information, mapping the first set of signals to a second set of signals encoded using an encoder (e.g., an encoder circuit), wherein the second set of signals comprises one or more code words selected from among the valid code words of one or more vector signaling codes and an identifier of the subset of the one or more vector signaling codes from which the selection was made, and providing the second set of signals for transmission over the communication bus as a set of signals carried over multiple wires. A corresponding decoder decodes a received second set of signals (possibly altered in transit over the communication bus) in an attempt to recover a replication of the first set of signals while reducing the amount of energy needed to do so.

In some embodiments, vectors can represent code words of the vector signaling code, each vector comprising a plurality of vector components, the code words obtained by different permutations of one or several basis vectors. In some embodiments, the code words so obtained may have quiescent vector components and non-quiescent vector components, and the set of all possible secondary code words can comprise a single vector signaling code or a union of several vector signaling codes. Sparse signaling codes are vector signaling codes for which the number of quiescent vector components and non-quiescent vector components meets some sparseness requirement. One such sparseness requirement may be that a ratio of quiescent vector components to total vector components is greater than or equal to one-third. However, other sparseness requirements may be used instead. In specific examples, a quiescent vector component is represented by a value of zero, a zero voltage and/or a zero current, but the sparse code need not be limited to such examples. In general, a quiescent vector component is a vector component that leads to substantially less physical power transfer from one end to another end of a bus wire, as compared with the physical power transfer caused by a non-quiescent vector component. The quiescent vector component is typically referred to herein as the "zero" symbol.

In some embodiments, different voltage, current, etc. levels are used for signaling and more than two levels may be used, such as a ternary sparse signaling code wherein each wire signal has one of three values. In some embodiments, there are no more than two non-quiescent vector components for each code word vector. In some embodiments, at least half of the vector components of each code word are quiescent vector components.

Hardware elements may be provided to provide storage for symbols of input information used for selecting code words, processing hardware to convert symbols to signals, parsing symbols into separate partitions, storing results, and providing the partitions in sequence as signals.

Various embodiments are given with reference to specific hardware implementations of small area and low power dissipation. Embodiments are described which discriminate between different subsets of code words in a power and pin efficient matter. At least one embodiment uses the analog sum of the values on the pins at the receiver to distinguish between subsets of code words. At least one embodiment uses the analog sum of the absolute value of the differences between the values on the pins at the receiver. At least one embodiment matches the lowest sorted difference value with the sorted input value.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other objects and/or advantages of the present invention will be apparent to one of ordinary skill in the art upon review of the Detailed Description and the included drawings.

BRIEF DESCRIPTION OF THE DRAWINGS

Various embodiments in accordance with the present disclosure will be described with reference to the drawings. Same numbers are used throughout the disclosure and figures to reference like components and features.

FIGS. 8A, 8B, 8C, and 8D are schematic diagrams that show aspects of four examples of a subcode discriminator circuit, respectively, in accordance with at least one embodiment.

FIG. 9 is a table that sets out further aspects the four examples of the subcode discriminator circuits of FIGS. 8A, 8B, 8C, and 8D.

DETAILED DESCRIPTION

Figure 1:
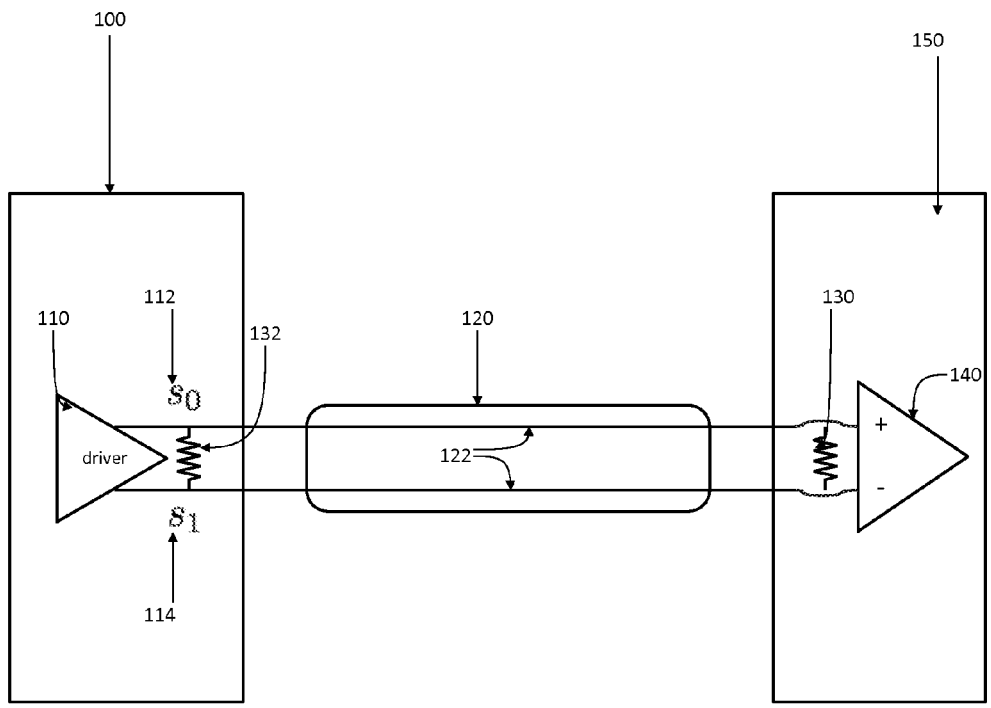
FIG. 1 is a schematic diagram that illustrates a prior art use of differential signaling for communication between two devices.

Conventional data communication approaches have shortcomings recognized by the inventors. FIG. 1 shows an example of a communication system that uses differential signaling. As shown there, a transmit unit 100 is connected by a communication bus 120 to a receive unit 150. The transmit unit 100 comprises a driver unit 110 that drives the two wires 122 of the bus 120. The driver unit 110 generates two signals 112 and 114 denoted by s0 and s1 based on the information to be transmitted on the bus 120. The driver 110 may drive the wires of the bus in voltage-mode or current-mode. The bus 120 may be terminated at the receiver by termination resistor 130 and at the transmitter by a termination resistor 132. A differential amplifier or comparator 140 measures the voltage across the termination resistor 130 and detects the data transmitted on the bus. For differential signaling these two signals satisfy the equation s0=−s1 and this property gives differential signaling its excellent properties with respect to common-mode noise and crosstalk. The driver 110 may perform additional tasks such as amplification, pre-emphasis and equalization. The differential amplifier 140 may perform additional tasks such as de-emphasis, equalization and equalization.

Figure 2:
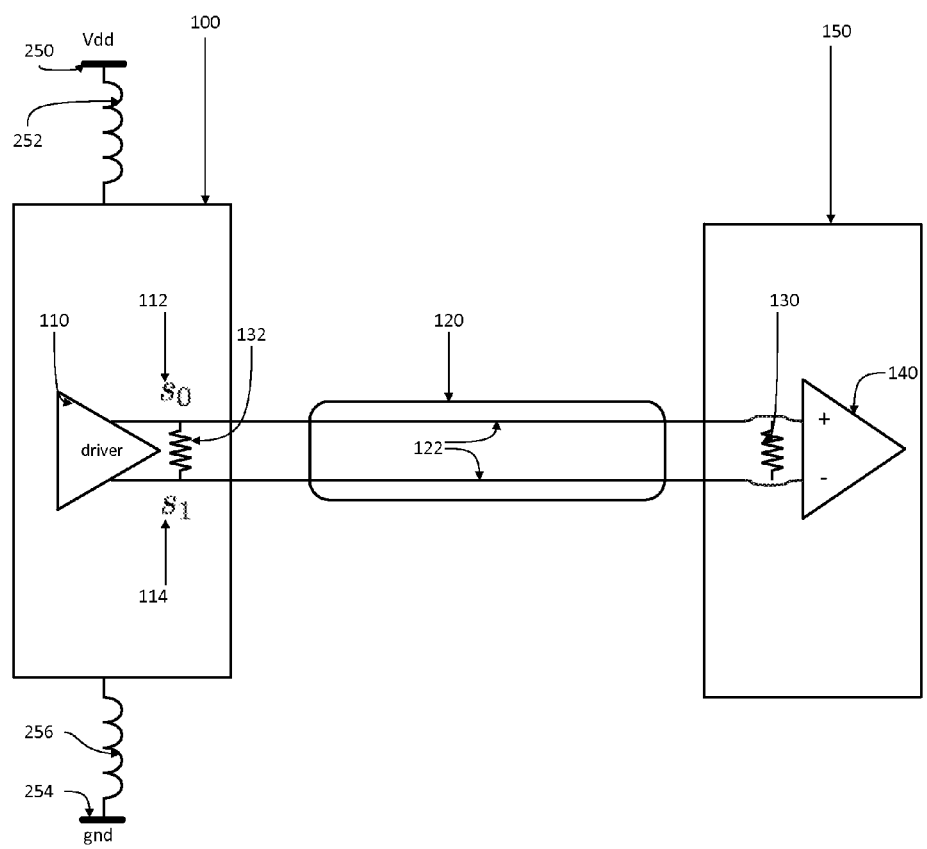
FIG. 2 is a schematic diagram that shows how the prior art use of differential signaling mediates the effect of common-mode noise, such as produced by the presence of inductance in the transmitters power supply leads.

FIG. 2 illustrates aspects of the circuitry of FIG. 1 in further detail and also illustrates how SSN can be minimized for differential signaling. FIG. 2 shows a communication system based on differential signaling where the connection to the power supply is taken into account. The circuitry of the transmit unit 100 requires a power supply to operate. In FIG. 2, the transmit unit 100 is connected to the positive terminal 250 of the power supply and the ground terminal 254. The terminals 250 and 254 supply the transmit unit 100 with a voltage of Vdd volts. A parasitic inductor 252 impairs the connection to Vdd. This parasitic inductor 252 is the result of, e.g., a bondwire and/or impedance discontinuity in the IC package as one of moderate skill in the art will recognize. The connection to ground 254 is impaired by a parasitic inductor 256. When the circuitry in the transmit unit 100 causes variations in currents through the parasitic inductors 252 and 256 a voltage develops across parasitic inductors 252 and 256. This causes a drop in power supply voltage for the electronics in transmit unit 100 and this may cause the signals transmitted on the bus to be disturbed. The time-varying current through parasitic inductors 252 and 256 is largely determined by the signaling method. For binary differential signaling the variation is minimal since s0=−s1.

Figure 3:
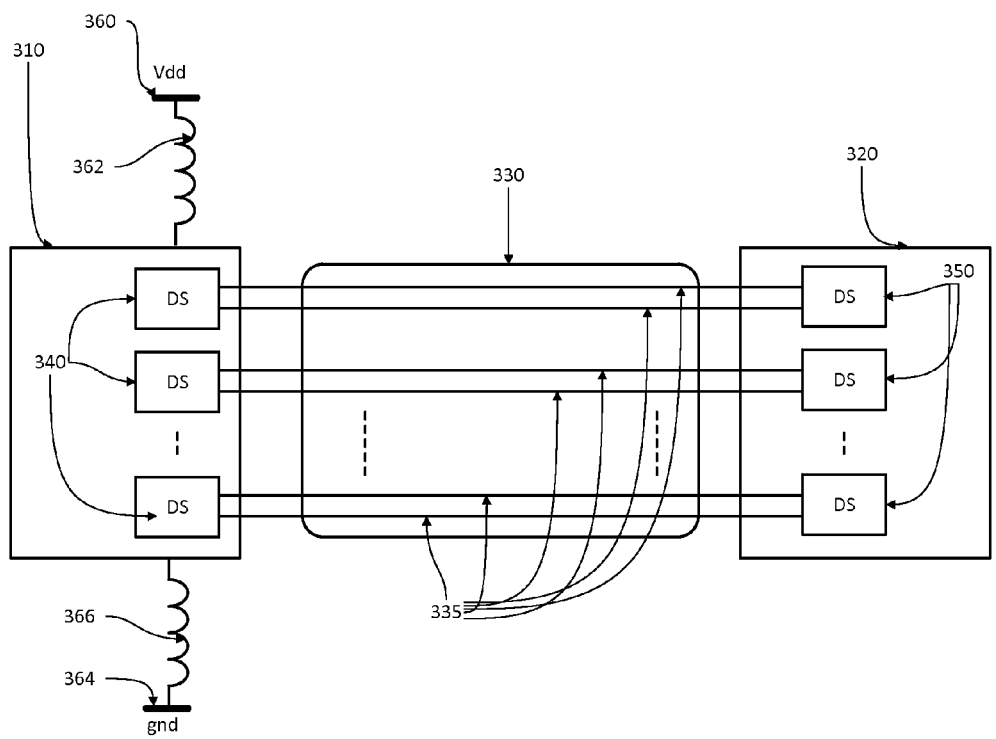
FIG. 3 is a schematic diagram that shows a prior art use of multiple differential signal pairs for communication between two devices.

In a communication system where multiple wires are used, one may use differential signaling on each wire pair as illustrated in FIG. 3. FIG. 3 shows an example communication system where communication takes place over a bus 330 comprising 2n wires 335. The transmit unit 310 comprises n drivers 340 that implement differential signaling. Each of these drivers 340 is connected to a different pair of wires of the communication bus 330. The wires 335 of the communication bus 330 may be terminated at the transmitter and/or at the receiver. At the receiver, differential receivers or comparators 350 sense the signals on each pair of wires. The drivers 340 in the transmit unit 310 are connected to the positive power supply 360 and ground 364. Both connections are through parasitic inductors 362 and 366, respectively.

Since differential transmitters are used, the variation of the currents through parasitic inductors 362 and 366 may be small. The reason for this is very clear when binary differential signaling is used and the bus is driven in current-mode. In this case, each of the drivers 340 sources a current of some strength I into one of the wires of the wire pair and sinks a current of some strength I from the other wire of the wire pair. The sum of all currents that is sourced by the drivers 340 is supplied though parasitic inductor 362 and is constant. The sum of all currents that is sunk by the drivers 340 is sunk into ground 364 through parasitic inductor 366 and is constant as well. Hence the introduction of SSN is minimized. One may require multiple connections to Vdd and ground to limit the current through each of these connections. Also in this case the introduction of SSN is minimized, as one of skill in the art will recognize.

A drawback of using binary differential signaling is that the pin-efficiency r is only 0.5. Here and in the following, the pin-efficiency of a transmission system is defined to be the number of bits transmitted in one cycle, divided by the number of wires needed to transmit those bits, wherein a cycle may be equal to the reciprocal of the frequency of the clock used. To achieve a bit rate of fb bits per wire, the symbol rate or frequency of operation per wire has to be 2 fb when r=0.5. For high-speed operation and/or for longer transmission paths, the amount of power spent in the drivers has to increase substantially to mitigate the effects of attenuation. To achieve a higher pin-efficiency with differential signaling, one can opt for multi-level differential signaling. Although this leads to higher pin-efficiencies, the required transmission power to assure reliable communication may increase faster than the advantages obtained from a potentially lower symbol rate, as is, for example, described in Healey.

In Poulton, a multi-wire differential signaling scheme is proposed that has the potential to obtain higher pin-efficiencies than differential signaling. Furthermore, the scheme disclosed in Poulton retains several of the noise resilience properties of differential signaling. However, the scheme disclosed in Poulton has several issues. For example, Poulton describes schemes for three and four wires. Often, transmission takes place over a bus comprising more than four wires, or as few as two wires. As another example, as pointed out in Poulton the method disclosed in Poulton is not very power-efficient. A signaling method that achieves high pin-efficiency while remaining power efficient is desirable. As yet another example, encoding and decoding the signaling method as disclosed in Poulton is not straightforward, especially when attempting to extend the scheme to a number of wires that is more than four.

In Horowitz, a signaling method that reduces SSN is introduced. The method in Horowitz is based on multi-level signaling where the sum of the signal levels transmitted on the bus is kept close to each other from bus cycle to bus cycle. There are several problems to this approach. For example, for the method to have optimal effect, the driver circuitry uses a single connection to Vdd and a single connection to ground. This can become impractical beyond a small number of bus wires such that the total required current can be limited. As another example, encoding and decoding such signaling schemes can become impractical beyond a small number of bus wires since encoding and decoding becomes complex.

In Cronie I, orthogonal differential vector signaling (ODVS) is introduced. ODVS allows for chip-to-chip communications with a pin-efficiency larger than that of differential signaling (up to 1) while the resilience against several types of noise is similar to that of differential signaling.

Where larger pin-efficiencies are desirable, the methods and apparatus of Cronie II and/or Cronie III may be used. As explained therein, spherical codes can be used to obtain pin-efficiencies larger than 1. In some embodiments, these spherical codes are permutation modulation codes as in Cronie II or sparse signaling codes as in Cronie III. These codes lead to pin-efficient and noise resilient chip-to-chip communications while keeping the power consumption of transmitter and receiver low compared to conventional signaling methods.

An enhancement to the vector signaling code technique makes use of the observation that the balance between complementary signals in a differential signaling channel need not be held exactly to zero. A certain amount of SSN can be tolerated by an integrated circuit through the use of decoupling capacitors, and a certain amount of receive common mode noise rejection may still be obtained from receiver thresholding. Some SSN can also be compensated for within the transmitter of an integrated circuit. An example compensation circuit consists of an unused transmitter that is driven with a value that is the opposite of the SSN value generated by the encoder, which drives an on-chip capacitor or other active circuit that simulates some aspects of the resistive and/or reactive load of the link, thereby reducing the overall SSN of the circuit. The noise induced in the receiver by the termination of the unbalanced signal cannot be eliminated by these techniques.

Cronie III and Cronie IV disclose the use of balanced (having a zero sum across all values within each code word), sparse (incorporating a preponderance of a quiescent value) vector signaling codes with transmission media based on communication of groups of signals. Within a symbol period, the group of signals representing such a balanced sparse signaling code shares many of the advantageous characteristics of differential signaling, but with higher pin-efficiency. Such vector signaling codes may also be created from base vectors that are unbalanced, for example summing to +1 or −1 rather than zero.

The codes produced from such base vectors will also be unbalanced. However, a short-term imbalance across the group of signals representing such a code need not be inherently detrimental. An undesirable long-term imbalance may be corrected by the creation of a vector signaling code comprising the union of codes derived from different base vectors, herein described as subsets of the union. A vector signaling code comprising subsets derived from base vectors having complementary sums, for example both +1 and −1, will present an enlarged code word space. In some embodiments, imbalance correction is performed statistically, through the inherent use of subcodes derived from different base vectors as the overall code word space containing a mixture of such codes is used. Other embodiments may actively maintain such balance, by selective use of particular code values from a collection of code values assigned equivalent meaning but comprising different vector components.

Using a "union of codes" allows a vector signaling code to be used in an integrated circuit with a constrained SSN that achieves a higher link throughput because more code words are available to be used. This is particularly applicable in links that are both pin and process frequency limited, but do not face a transmission path that is challenging in terms of loss or equalization requirements. An example of such of a link is an inter-chip link within a small handheld device such as a smartphone.

Enhanced Vector Signaling Encoder/Decoder

Figure 4:
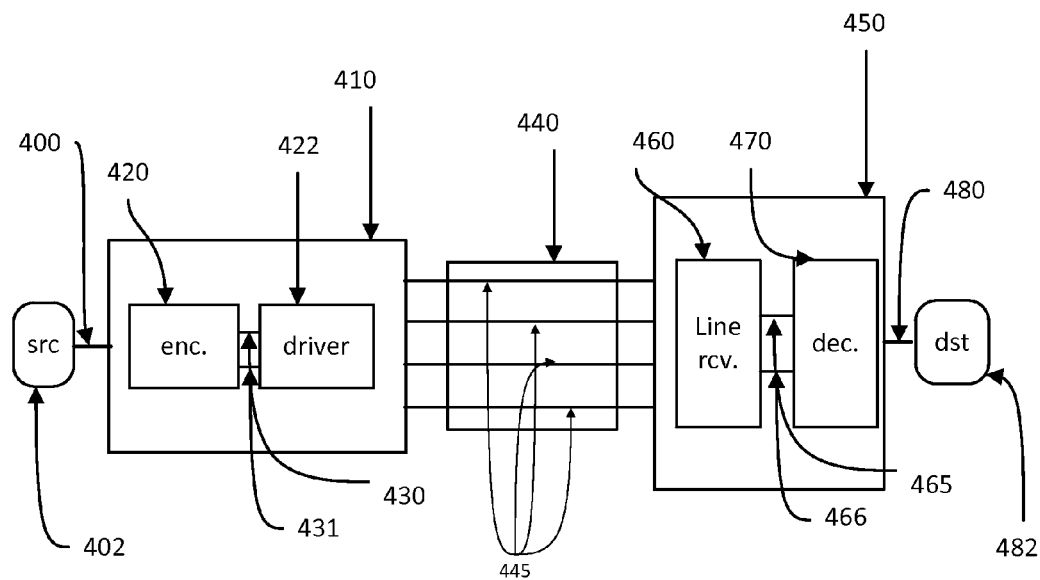
FIG. 4 is a schematic diagram that depicts aspects of an example multiple wire communications channel utilizing encoding and decoding in accordance with at least one embodiment.

In the example shown in FIG. 4, information is transmitted over a communication bus 440 at least in part by receiving a first set of signals 400 representing the information from any suitable source 402, mapping the first set of signals to a second set of signals 430 and 431 using an encoder 420, wherein the second set of signals comprises one or more code words 430 selected from among the valid code words of one or more vector signaling codes and an identifier 431 of the subset of the one or more vector signaling codes from which the selection was made, and providing the second set of signals 430 and 431 for transmission over the communication bus 440 as a set of signals carried over multiple wires 445. A corresponding decoder 470 decodes a received second set of signals 465 and 466 (possibly altered in transit over the communication bus) in an attempt to recover a replication 480 of the first set of signals 400 while reducing the amount of energy needed to do so relative to conventional techniques. The replication 480 may be provided to any suitable destination 482.

The encoder 420 may be incorporated in a transmit unit 410. The transmit unit 410 may further include a driver 422 configured at least to generate signals suitable for transmission by the communication bus 440 based at least in part on the set of signals 430, 431 provided by the encoder 420. The driver 422 may be communicatively coupled with the encoder 420 and the communication bus 440. The decoder 470 may be incorporated in a receive unit 450. The receive unit 450 may further include a line receiver 460 configured at least to receive signals in accordance with those generated by the driver 422 and to provide corresponding signals 465, 466 to the decoder 470. The line receiver 460 may be communicatively coupled with the communication bus 440 and the decoder 470.

Analog Sum-Based Subcode Discriminator

Figure 11:
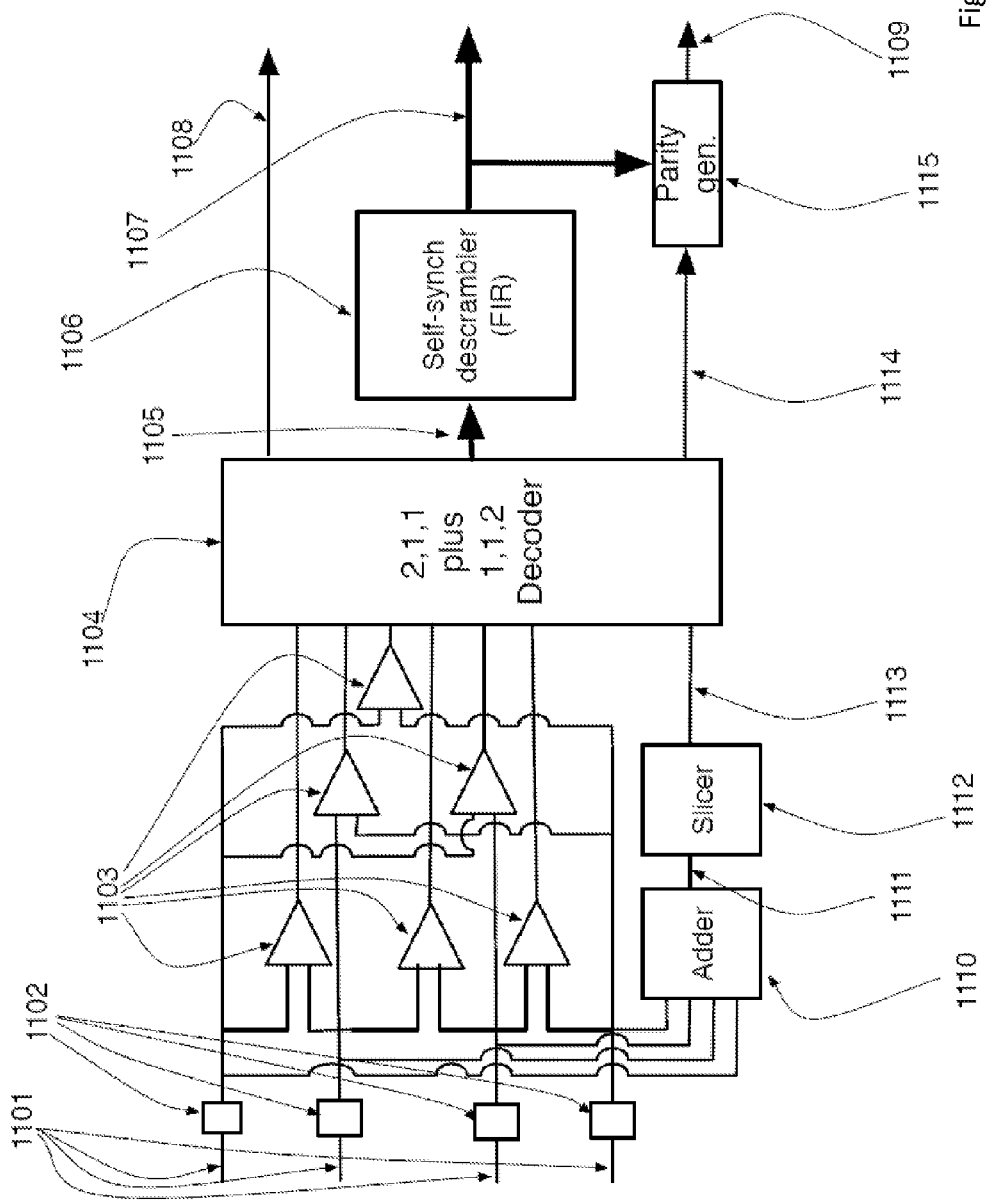
FIG. 11 is a schematic diagram that shows aspects of an example four wire receiver in accordance with at least one embodiment.

At least one embodiment in accordance with the invention discriminates between subcodes of a vector signaling code transmitted over physical media by evaluating the analog sum of the values transmitted to represent a code word. An additional circuit containing an analog summer and a slicer is added to the link, allowing vector signaling codes derived from base vectors having different sums to be distinguished, as shown in the example of FIG. 11. A circuit 1110 computes the analog sum 1111 of the inputs 1101 of the vector signaling coded circuit. There are several well-known variants of this type of circuit. A typical circuit converts each input voltage into a current. The currents formed from each input are then summed across a resistor to form a voltage representing the sum of the inputs. The summed voltage output of said summer circuit 1111 is then input into a voltage slicer circuit 1112. Several variants of this circuit exist. The simplest variant of the slicer circuit has a fixed reference threshold against which the summed input is compared. If the summed input voltage is guaranteed by statistical or other means or operations to have transitions, a more sophisticated circuit can be employed that has enhanced noise rejection. An embodiment that ensures these transitions is described later in this application. This enhanced circuit can use well-known dynamic techniques to find the vertical and horizontal center of the eye of the signal.

If the vector signaling subcodes employed have a difference of more than one SSN value, for example subcodes summing to the values +1 and −1, then this analog slicer will have more margin to work with when determining which code set is present. In accordance with at least one embodiment, a difference of two units between subcodes is large enough so that the decision element of the circuit is not the limiting factor, yet the codes are still large enough to provide good throughput.

The operation of the analog sum circuit is most easily illustrated on a single pair of wires with a ternary code. In this example, a single-ended signal is carried in parallel on two transmission lines plus a differential signal superimposed on those same two transmission lines, in the manner of a telephony phantom circuit. The amplitude of the single-ended signal need not be exactly the same as for the differential signal. The signal sizes of each can be adjusted to balance the performance between the two links. For example, the default case may be that the single ended driver (actually a pair of identical single-ended drivers) would add either 0 mv or 500 mv to both wires and the differential driver would add 0 mv to one wire and 500 mv to the other wire for a total of 1000 mv, resulting in combined levels representing both single-ended and differential drivers of 0, 500 & 1000 mv. If the Bit Error Rate (BER) experienced by the link was caused predominantly by the single ended driver, its value could be bumped up to 0 mv & 550 mv and the values of the differential driver could be reduced to 0 mv & 450 mv to put the levels at 0, 450, 550 & 1000, creating a ternary code where the central level has two sub-levels. A vector signaling code may be transmitted over such pair of wires by having the three independent signals select a subcode of the code, and a code word within the selected subcode.

The case of ternary links with more than 2 wires is similar. In the four wire example, each transmitter has drivers that can output a signal that can be, as examples, high, low, or zero. The receiver looks effectively as if it has 6 differential links (between each pairwise combination of the four wires, albeit with fewer than six degrees of freedom) and one single ended receiver with an input driven by the sum of the four input signals to identify the subcode in use. As with the two wire case, the transmitter may modify the voltages driven onto each wire depending on the particular combination of differential signals being represented.

Reference Generation for the Analog Sum Receiver

In the simplest case when both common-mode and reference noise are very low, single-ended receivers need twice the eye opening as that needed by differential receivers. This is because in a single-ended receiver, one input wire is connected to one leg of the comparator, and the other leg is connected to a reference, which is set to be near the middle of the eye opening. In a differential receiver, the two input wires are each connected to a leg of the comparator and have signals that are on opposite edges of the eye.

By designing the link so that the eye opening of the analog sum is twice as high as the eye opening between the two wires, the two receivers (differential and analog sum) will ideally have roughly the same properties. In practice, however, this advantage may be constrained by common-mode and reference noise.

The four example versions of the receiver described below each have different properties. These are illustrated in FIGS. 8A, 8B, 8C, and 8D, and summarized in FIG. 9.

The first version—"Fixed reference vs. Sum" of FIG. 8A uses a comparator 802 with the analog sum 807 of all input signals 801 as one comparator input, and a fixed reference 804, for example the receiver's version of ground, as the reference input of the comparator to produce output 803. This circuit is by far the simplest, but it will perform the worst against common-mode and reference noise.

The second version—"Dynamic reference vs. Sum" of FIG. 8B obtains a reference that is the time average of set of the input signals 806 over, as an example, the last 100 bits of the analog signal. The comparator 802 input is the analog sum 807 of all input signals 801. The comparator 802 reference is obtained by time averaging 805 that sum, for example as charge stored in a small integrated capacitor. This version depends on scrambling or other coding being present to either randomize the data or otherwise arrange the condition that every level is regularly presented at the receiver. In some circumstances, this circuit may be the best compromise of the four versions, providing resistance to low and medium frequency common-mode and reference noise. However, in at least some circumstances, this circuit's immunity to high frequency noise such as that caused by crosstalk may be limited.

The third and fourth versions—Decision Feedback middle vs. Sum of FIG. 8C and Decision Feedback middle vs. Sum/2 of FIG. 8D, attempt to find the "zero" value of the immediately previous bit by using the output of the decision made for that bit. For example, if the previous bit had input values of 0 and +, the circuit will have decided which is which, and will store the analog 0 value for use as the comparator reference. FIGS. 8C and 8D show this operation with an analog multiplexor 808 selecting the 0 input value based upon the previous bit decision 809. The analog value of the input determined to be 0 is captured by an analog sample & hold circuit 810 triggered by data clock 811, with the stored value used as the reference input to the comparator for the next cycle. Some embodiments may use a comparison value captured and stored 2 or more bits earlier when running at high speeds and/or incorporating deeply pipelined receive processing. The advantage of Decision Feedback sampling is that this recent value will have experienced most of the high frequency noise that the current bit also experiences. This technique does not protect against the highest frequency components of crosstalk.

The difference between the two variations of Decision Feedback is whether the sum or the average of the input wires is used. FIG. 8C shows the analog sum 807 of all inputs 806 being used as comparator 802 input to produce output 803, while FIG. 8D shows the average 812 of all inputs 806 being used as comparator 802 input to produce output 803. The sum has a larger eye opening, but the average of the wires will match the common-mode noise that was experienced by the stored value better.

In order to represent the noise implications involved in creating the analog sum (or average), FIG. 9 incorporates a factor "NSL" or Noise Sum Loss to account for the noise impact of the process of combining the noise on the two wires. The non-thermal noise from two wires convolve with each other instead of strictly add; thus, the combined noise value from two wires may be estimated as being more than one and less than two times the noise value of a single wire, depending on correlation effects.

Analog Sum of the Absolute Value of the Differences-Based Subcode Discriminator

Figure 5:
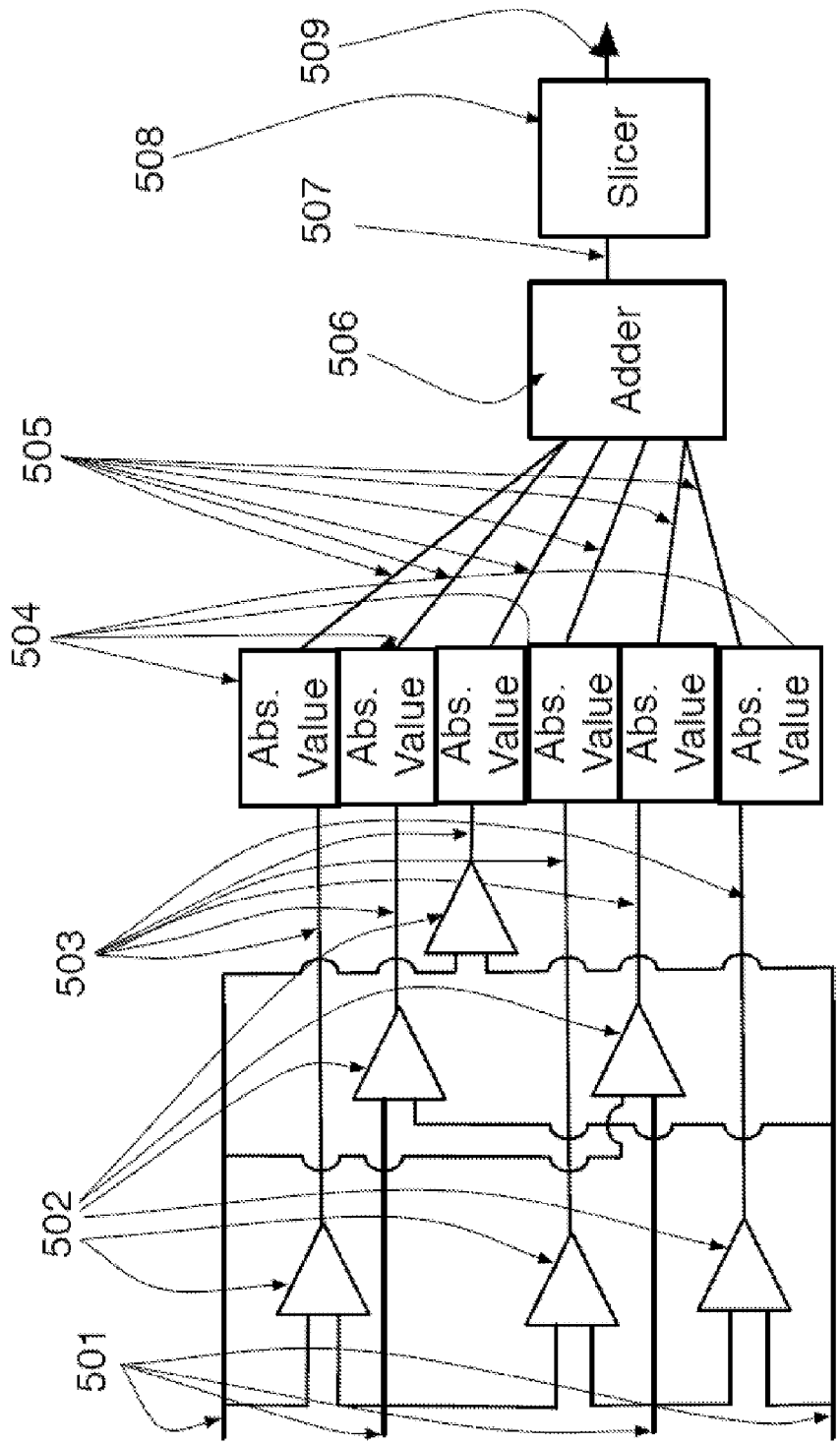
FIG. 5 is a schematic diagram that illustrates aspects of an example subcode decision utilizing the calculation of a sum of absolute values of differences in accordance with at least one embodiment.

Another embodiment discriminates between vector signaling subcodes based on the analog sum of the absolute value of the differences on the wires. The advantage of this technique is that the circuit is highly tolerant of common-mode and reference noise because it is fully differential. For example, the analog sum of the absolute value of the differences of all code words in the subcode generated by (+1, 0, 0, −1) has the value of 6 and all code words in the subcode generated by (+1,+1,−1,−1) have the value of 8, wherein here and in the following a code generated by a vector is the permutation modulation code generated by that vector, i.e., the code obtained from all the distinct permutations of the coordinate positions of the generating vector. As another example, the value for the code word (0,+,−,0) equals ABS(0−1)+ABS(0−−1)+ABS(0−0)+ABS(1−−1)+ABS(1−0)+ABS(−1−0)=1+1+0+2+1+1=6, wherein ABS(a) is the absolute value of a. The example of FIG. 5 shows this operation performed by distinct circuit elements. Four input signals 501 are received and differences 503 obtained using differential amplifiers 502, absolute value circuits 504 are used to obtain absolute values of the differences 505, which are then summed by adder 506 to obtain a sum of absolute values of differences 507, which is compared to a threshold by slicer 508 to obtain result 509.

In accordance with at least one embodiment of the invention, two or more functions may be combined to implement equivalent operations, such as by use of a differential input absolute value element, or a multi-input adder/comparator element. An example illustrated in FIG. 6 utilizes a circuit that divides a high-speed comparator design into its two natural halves. The first stage of the high-speed comparator is a moderate gain differential amplifier 602 and the second stage is a second moderate gain differential amplifier 606. Two stages are often combined in this manner in high-speed circuits because it is difficult to achieve high gain when the bandwidth of the circuit approaches the gain-bandwidth product of the underlying transistors. The output of the second amplifier is the digitized decision 607 of which input 601 is higher. This decision is connected to an analog switch circuit 604 that selects one of the two legs of the output 603 of the first amplifier, thus completing the absolute value function by producing the result 605.

The output of this switch, representing the absolute value of the difference of inputs, is connected to a voltage to current converter. The current from multiple such differential amplifier/switch circuits is summed together across a resistor to form a voltage representing the analog sum of the absolute value of the differences between the multiple inputs.

This value is then passed through an Automatic Gain Control (AGC) circuit, which is well known in the art, and a reference level is prepared at the middle of the eye opening. A scrambler circuit, as described later in this disclosure, is employed to ensure that both levels arrive at the AGC regularly enough for said AGC to be able to bring it to a preset size in preparation for slicing. The input signal is then compared to the reference voltage yielding a decision as to which subcode was present at the input.

Figure 6:
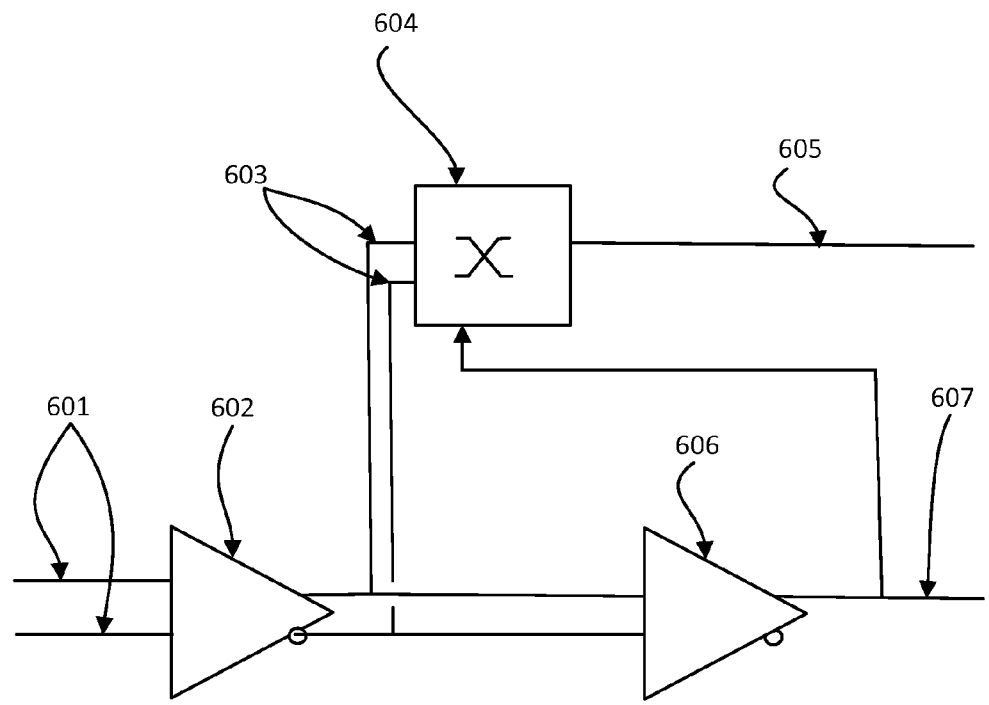
FIG. 6 is a schematic diagram that shows aspects of an example combined differential absolute value circuit and comparator in accordance with at least one embodiment.
Figure 7:
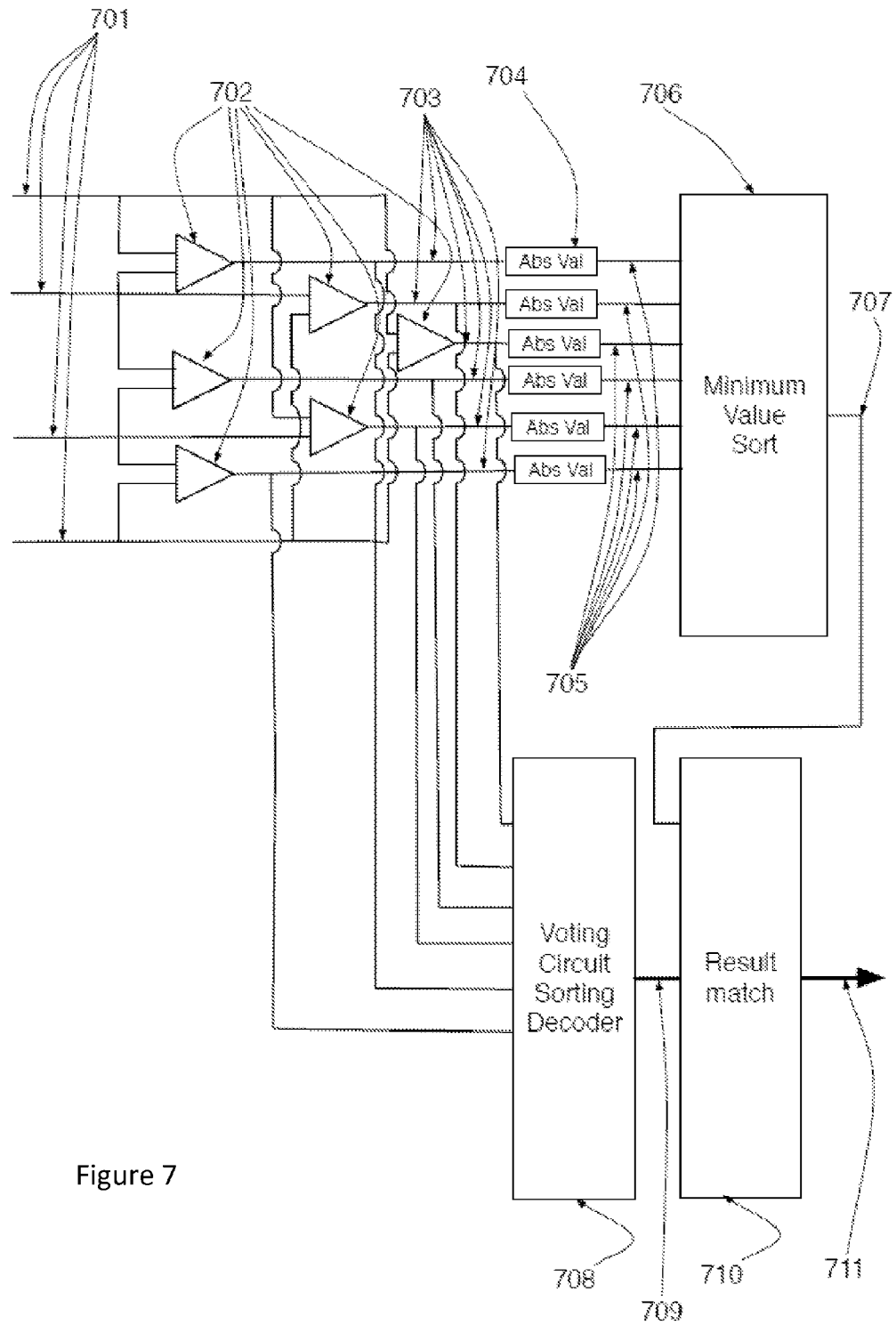
FIG. 7 is a schematic diagram that shows aspects of an example decoder in accordance with at least one embodiment.

Matching of the Sorted Absolute Value of the Differences with the Sorted Input Values-Based Subcode Discriminator In another example, discrimination between vector signaling subcodes may be based on matching the sorted absolute value of the differences of the sorted input values. For example, an N wire vector receiver, the pick 2 combinations of N, or C(N,2) two-stage high speed comparators as shown in FIG. 6 may be employed to produce absolute values of input differences. Here and in the following, C(N,K) denotes the number of all combinations of K elements of an N-element set. As is commonly known, C(N,K)=N!/K!*(N−K)!. The example of FIG. 7 shows an equivalent function implemented using separate differential line receivers 702 producing difference signals 703 processed by absolute value circuits 704 to produce absolute values of differences 705.

The set of absolute values of differences is input to a sorting circuit 706 that need only determine the lowest member of the C(N,2) inputs. The lowest member of this sorted result 707 identifies the comparator that is comparing two of the input wires 701 at the same signal level.

In parallel with that sorting operation, the N received input values 701 or alternatively the C(N,2) differences of the N input values 703 are input to a conventional voting circuit as described in Cronie III and shown as 708. As described in that reference, such sorting-based decoding methods result in a code word determination matching the input values, without the knowledge of which subcode it is working with. When applied to vector signaling codes comprising unions of subcodes, the result may not be unique. Thus, the decoder output 709 is considered to be a preliminary determination, as no subcode information was known.

At the completion of both operations, the input wires identified by the lowest member of the first sorted result 707 are matched up 710 with the preliminary decoding 709 produced by the voting circuit 708. This combination of identification of a subcode and identification of a code word uniquely identifies the original encoded value. The preliminary result obtained from the code word decoder is finalized as the output result 711 with the benefit of the knowledge of which subcode was present. Alternatively, the output of the two operations may be used as input to a memory or logic based decoder which directly determines the output code word without the need for said preliminary decoding.

For example, consider a four wire vector coding system in which the subcodes consisting of all permutations of the vector (+1,+1,0,−1) and all permutations of the vector (+1,0,−1,−1) are employed. In this example the code word (+1,0,+1,−1) is sent on the link over wires named A, B, C and D. The six first stage differential amplifiers determine the six differential voltages by performing the subtractions A-B, A-C, A-D, B-C, B-D, C-D. The input voltages are 250 mv for the symbol "+1", 150 mv for the symbol "0", and 50 mv for the symbol "−1" and the differential amplifier has a gain of 3 in this example. The output of the six differential amplifiers will be 300 mv, 0 mv, 600 mv, −300 mv, 300 mv, and 600 mv respectively. The absolute value of these values is prepared which are 300 mv, 0 mv, 600 mv, 300 mv, 300 mv, and 600 mv respectively. These values are sorted to find the lowest value, in the present example being 0 mv for the comparison between A and C.

Separately, a conventional voting sorter may be employed to put the input wires in order. It will put the inputs either in the order A, C, B, D or C, A, B, D since the values on A and C are very close. Since this voting sorter does not yet know whether the current code word is in the subcode generated by (+1,+1,0,−1) or in the subcode generated by (+1,0,−1,−1) subcodes, it is not yet able to uniquely determine the code word that was sent. The possibilities at this point are (+1,0,+1,−1), (+1,−1,0,−1) or (0,−1,+1,−1).

Finally, the two results are combined. The comparison that was found to be the lowest is compared to A and C. Since A and C were found to be the two highest values, they are both "+" symbols and the current code word is in the subcode generated by (+1,+1,0,−1) subcode. The decoder can then determine that the input code word was (+1,0,+1,−1).

In a direct decoder alternative for this example, the six bits of comparator output plus the four bits that identify the two input wires that have the lowest difference are used as input to a memory or logic based decoder. Said decoder outputs the selected code word, incorporating both subcode and code word identification into determination of the output.

Deskew Circuits

The applicability of all of the above techniques is improved if they are employed after a sample and hold circuit, which is well known in the art. This circuit takes an analog sample of the input wire and delays it so that the skew, also known as differential delay, encountered by the wiring between the transmitter and receiver can be accounted for. Other analog or digital deskew solutions known in the art may also be applied.

Digital Signal Processing

The described discrimination techniques are applicable in an example in which the receiver employs digital signal processing techniques. One such example samples the input signals using an analog to digital converter, with the remaining previously described steps performed numerically by a program executing on a digital signal processor or general purpose processor.

Maximum Likelihood Decoder

Another example presents increased receiver noise tolerance using a vector decoder designed so that the value of the differential inputs plus the subcode discriminator input are both decoded to the output value that is of maximal likelihood. Maximum Likelihood Decoders are well known in the art, so only details of their interrelationships with other components are described herein.

Scrambling

Scrambling or other techniques to introduce randomness are ideal for use with a constrained sum link. In Table 1, all but the fixed reference receiver require all of the receiver levels to appear regularly at the receiver, and this requirement may be met statistically through scrambling of the data stream entering the transmit encoder, with a corresponding descrambling being performed at the output of the receive decoder. Such scrambling methods are well known in the art, and are typically based on running the data through a finite impulse response filter at each end, usually referred to as a self-synchronizing scrambler.

Goal-Seeking Run-Length Limiter

If more code words exist than are required to handle the user throughput, a goal-seeking circuit can be added to statistically constrain the run-length of the system. A given method for receiver clock recovery may be effective over a limited range of input patterns, i.e., requiring a signal transition on each wire within a limited number of bit times. Scramblers only statistically guarantee the number of consecutive ones or zeros on each of the wires in the link, and may be thwarted by pathological data patterns. It is possible to dramatically reduce the probability of failure by having several of the code words redundantly encoded with other code words with the opposite properties. A goal-seeking circuit then watches for excessively long runs of a given signal value being put onto the wires and uses an alternative coding containing a value which disrupts the run when given the chance.

Goal-Seeking Disparity Reduction

If more code words exist than are required to handle the user throughput, a goal-seeking circuit can be added to statistically constrain disparity of the system. Scramblers only statistically guarantee the balance of ones or zeros on each of the wires in the link. The imbalance is called the disparity. It is possible to reduce the disparity of the system by having several of the code words redundantly encoded with other code words with the opposite properties. A goal-seeking circuit then watches the disparity that is put onto each of the wires and, when the scrambler selects one of the code word that has an alternative coding, selects that alternative coding if it can help restore the average DC level of the wire that is farthest from having no disparity. The net result of this circuit is that overall immunity to common mode signals may be improved, receive errors caused by baseline wander may be reduced, and the size of any necessary AC coupling capacitor may also be reduced.

Error Detection function

If more code words exist than are required to handle the user throughput, a code word may be reserved to provide an error detection function such as a parity check. In accordance with at least one embodiment, a first code word is identified, and is associated with a second code word. When the first code word is selected (that is, the combination of the input data and the current state of the scrambler would normally cause selection of the first code word from the current code word set), a determination is made whether the first code word or the second code word will be sent based on the parity of the unscrambled input data, for example, by sending the first code word if the input data is of even parity and sending the second code word if the input data is of odd parity. The receiver may mark the decoded data with a parity identifier based on which code word is received, and may determine if the parity identifier is accurate after the decoded data is descrambled. As an example, transmitting four-bit data values will on average make one such selection per sixteen data values transmitted, providing a 1:16 parity check of the data which is statistically distributed over the data stream based on the pseudorandom action of the scrambling sequence. Alternatively, a running parity check or other error detection check may be calculated over all values of the data stream, that check being sampled, transmitted, and reinitialized each time the error detection check code word pair is selected.

Link-Specific Control Signaling

If more code words exist than are required to handle the user throughput, one or more code words may be reserved as signals for link specific control signaling.

One example reserves one or more code words to provide protocol framing for data carried by the normal communications channel, by insertion of the reserved code word into the normal coded transmission stream between regular code words. Examples include marking start-of-frame, end-of-frame, and indicating an error transmission abort. Use of such out-of-band markers can greatly reduce the need to parse or interpret the in-band data stream as part of higher level protocol processing. A variant of this example reserves one code word as an escape symbol, which then indicates that another code word will follow that reuses the code words normally used for data transmission. Other examples reserve one or more code words for use in managing internal transceiver functions. Examples include commands issued by insertion of a reserved code word into the normal coded transmission stream to initiate adaptive line equalization training, synchronize internal states such as scrambling, set transmission levels, and cleanly initiate and terminate data transmission. In these examples, user data is not actively being sent while one of the out-of-band signaling codes words are being send.

Out-of-Band Communications Channel

A further example reserves one or more code words for use in an out-of-band communications channel of variable speed. One example assigns a reserved code word as an alternate coding for an in-band value to be transmitted. Whenever that value is presented to the encoder, a decision is made as to which code word to use based on a bit to be transmitted on the out-of-band channel, with an out-of-band "0" represented by transmitting the normal code word, and an out-of-band "1" represented by the alternative code word for the same in-band value. The out-of-band channel will typically use a serial protocol such as 8B10B, HDLC or 802.3 Ethernet to layer higher level functions onto this virtual physical layer transport. Such an out-of-band channel may be used to manage internal transceiver functions such as line equalization skew control, or adaptive level control, and may be used to provide Command/Control/Monitoring between the two communicating devices. In the four-wire example described below, this link runs at a variable rate, averaging 1/16th of the data rate of a single wire. If the per-wire data rate is 10 Gb/s, the out-of-band communications channel will run on average at 625 Mb/s.

SSN Compensation

Figure 14:
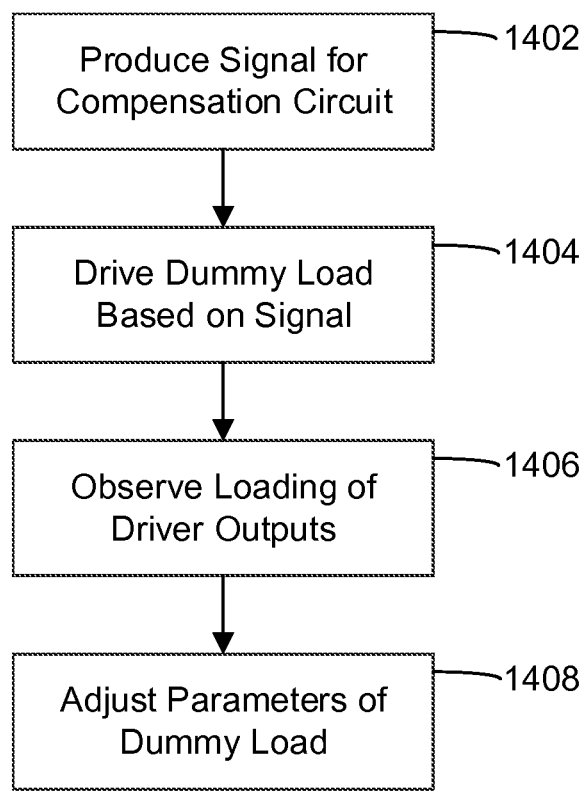
FIG. 14 is a flowchart depicting example steps for operating a compensation circuit in accordance with at least one embodiment.

An optional improvement to this circuit is to add a circuit to the transmitter that balances out the transmit SSN. In this improvement, illustrated in FIG. 14, the encoding circuit produces in step 1402 a signal that is the opposite of the imbalance that is produced by the vector that is to be sent. For example, if the encoder has decided to send the vector ++0−, the encoder would produce the signal for the SSN compensation circuit of −. This compensation circuit in step 1404 then attempts to balance the impact of the sending the line vector by consuming power that counter-balances what is being sent. Said circuit is connected to a faux capacitive or active load that attempts to mimic the load seen by the real driver.

Integrated SSN Compensation Circuit

In accordance with at least one embodiment, the SSN compensation circuit may be placed on the pad ring, immediately next to the drivers that are driving the outputs. The pad ring is that portion of an integrated circuit where the external drivers are located. This portion of the integrated circuit has special power resources and is the natural place for an SSN compensation circuit to reside. By placing the SSN compensator in close proximity to the actual drivers, the disruption to the local power supply circuit is minimized.

Line Observation SSN Compensation Circuit

When the circuit is implemented in the pad ring in close proximity to the actual drivers, a circuit can be implemented to directly observe, in step 1406, the loading experienced by the driver outputs and replicate that loading in the SSN compensation circuit by adjusting, in step 1408, the parameters on an active circuit that emulates the load.

4 Wire Circuit

In accordance with at least one embodiment, a link of 4 wires may be utilized that achieves a throughput of 1 bit per wire per clock, using the union of two codes: the code generate by the vector (+1,+1,0,−1), referred to as the {2,1,1}-code in the following, and the code generated by (−1,−1,0,+1), referred to as the {1,1,2}-code hereinafter. The union of these two codes is the code used for transmission over the four wires, and these codes themselves are subcodes of the transmission code.

Figure 10:
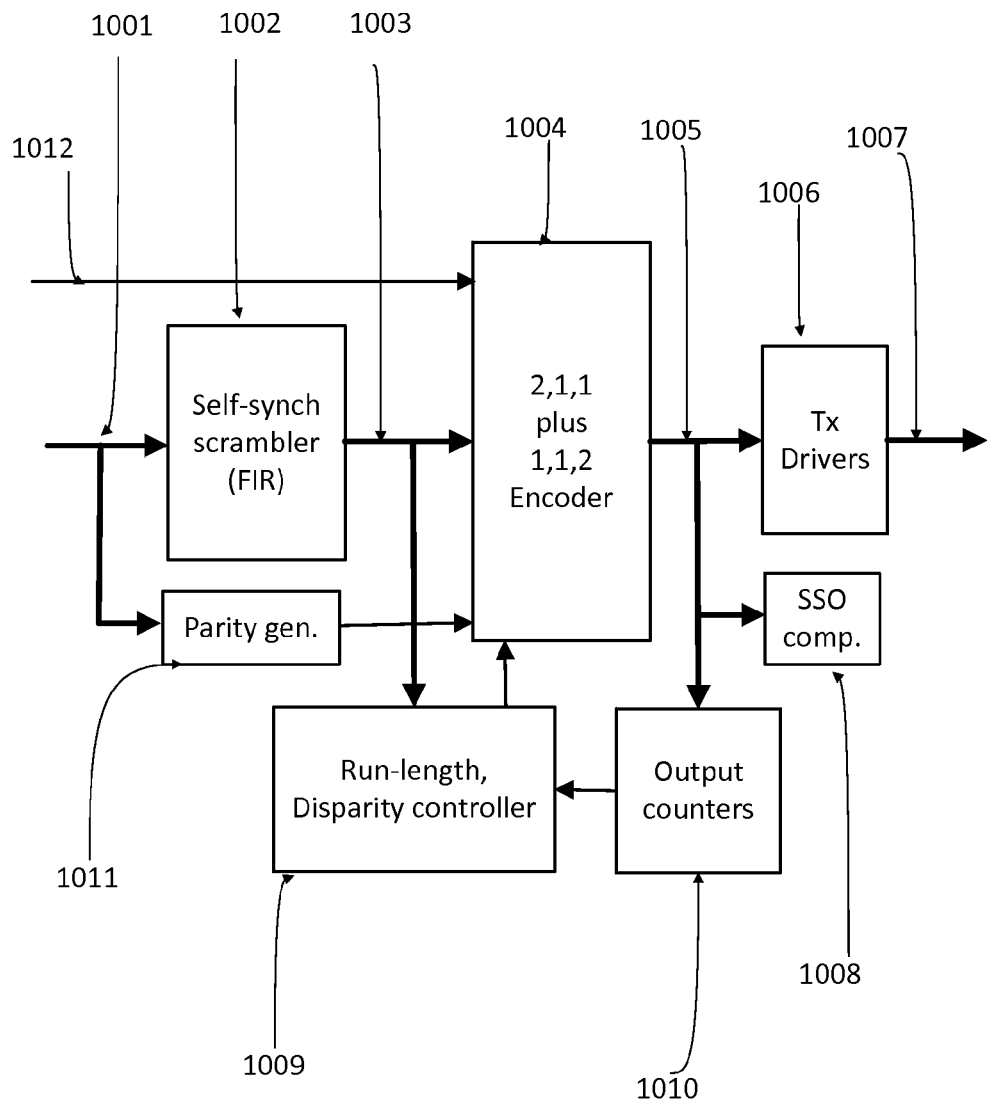
FIG. 10 is a schematic diagram that shows aspects of an example four wire transmitter in accordance with at least one embodiment.

The transmitter shown in FIG. 10 uses an SSN compensation circuit 1008 to reduce driver noise, and also uses data scrambling 1002 to ensure transitions. Optionally, counters 1010 and a goal-optimizing controller 1009 can be employed to limit run-length on any of the output signals 1005. Some embodiments may modify the particular voltage levels used by drivers 1006 in producing transmission outputs 1007, to balance performance of the code set determination and code word determination components of the system.

The receiver is based on a voting-plus-one-bit receiver that slices at a signal level derived from the analog sum of the wires. Because the arithmetic sum of signal levels in the {2,1,1} and {1,1,2} subcodes are two bits apart, determination of the subcode in use can be done efficiently and without limiting performance of the differential portion of the receiver (determination of the particular code word represented on the four wires.)

This type of transceiver is ideal for applications such as chip-to-chip interfaces in applications that are limited by both pin-count and process frequency, and which have a link that is less challenging in terms of attenuation and equalization requirements Four Wire Transmitter Operation A four wire transmitter in accordance with at least one embodiment is shown in FIG. 10. Data is provided to the transmitter as four-bit nibbles 1001. A self-synchronizing FIR scrambler 1002 is applied to the input data 1001 to produce a scrambled four bit input 1003 value to the encoder 1004. The encoder 1004 maps scrambled four bit input values 1003 to code words in the following way:

Eight values are mapped uniquely to single code words,

Six values are mapped redundantly to six pairs of code words, where the pairs of code words for each data value are optimally (e.g., maximally) distinct. A controller 1009 chooses the code word from the pair that best addresses the currently highest priority goal of sending a transition on the line that has the longest current run length, or of reducing line disparity, or both.

One value is mapped redundantly to a pair of code words, which are used to provide an error check function. When the scrambled input value 1003 selects this redundantly mapped code word pair, a parity generator 1011 calculates the parity of the original input nibble 1001 and uses the result to select a code word from the redundant pair, e.g., the first code word representing an even parity input, the second code word representing an odd parity result.

One value is mapped redundantly to a pair of code words, which are used to provide an out-of-band communications channel 1012, as described earlier.

In accordance with at least one embodiment, the transmitter may maintain per-line counters of each wire's output 1010 to determine run-length (duration of the longest period on which the wire has not had a signal transition.) The per-line run-length counter values are used by the controller 1009 to constrain maximum run-length. Some embodiments may also maintain per-line up/down counters 1010 which track line disparity, which may also be used as an input to be considered by the controller 1009 when selecting among redundant code words.

In accordance with at least one embodiment, the transmitter may utilize a transmit SSN compensation circuit 1008, as described earlier.

Four Wire Receiver Operation

The corresponding four wire receiver in accordance with at least one embodiment is shown in FIG. 11. The received signals 1101 are de-skewed using per-wire analog sample-and-hold circuits 1102 to eliminate differential path length effects between transmitter and receiver.

A six comparator 1103 voting decoder 1104 is used which can decode both the {2,1,1}- and {1,1,2}-subcodes. A classic tracking (or alternatively, AGC-based) slicer 1112 is used on the analog sum 1110 of the four wire signals 1111 to determine whether a 2,1,1 or a 1,1,2 subcode is present (a two bit difference). Since the transmitted run-length is controlled, a dynamic tracker can be employed that is resistant to low and medium frequency common mode noise. The output of the slicer 1113 selects between the 2,1,1 and 1,1,2 subcodes.

The decoder also recovers the variable rate overhead link 1108 from the decoder and marks appropriately identified decoder output nibbles 1105 with a parity check flag 1114. The circuit applies a self-synchronizing (FIR) descrambler 1106 to the decoder output nibbles. For nibbles marked with the parity check flag, the circuit checks the parity 1115 of the descrambled nibble, and provides an error notification 1109 if the parity does not match the transmitted value. Descrambled nibbles 1107 are output at line rate from the descrambler.

If the speed is too high for a given implementation technology, the circuit divides perfectly into phases (the number of phases is matched to that in the transmitter).

Example Procedures

Figure 12:
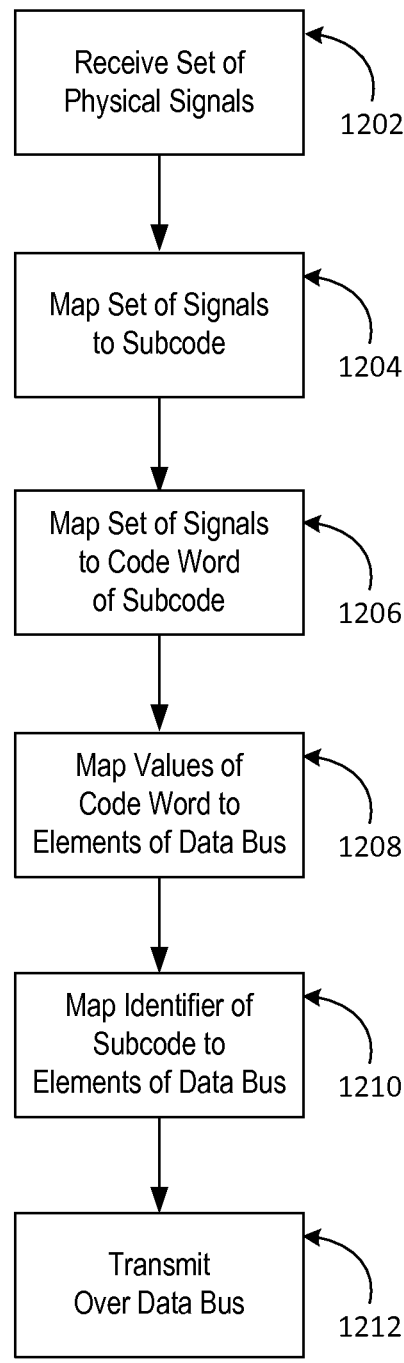
FIG. 12 is a flowchart depicting example steps for encoding signals in accordance with at least one embodiment.
Figure 13:
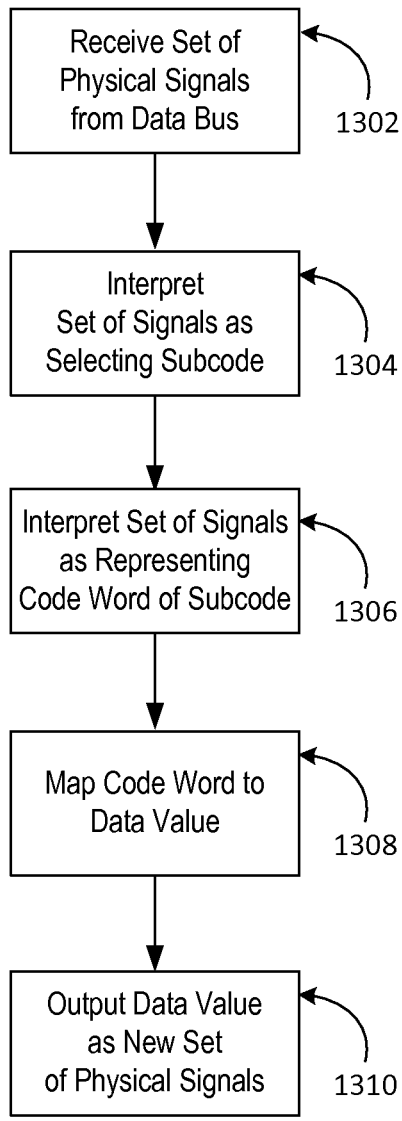
FIG. 13 is a flowchart depicting example steps for decoding signals in accordance with at least one embodiment.

The description now turns to example procedures in accordance with at least one embodiment of the invention. FIG. 12 depicts example steps for encoding signals. FIG. 13 depicts example steps for decoding signals. Suitable combinations of one or more components (e.g., circuits and/or circuit components) described above may be configured to collectively perform one or more of the steps of FIG. 12 and FIG. 13. The steps of FIG. 12 and FIG. 13 may be incorporated in procedures different from and/or larger than those illustrated by FIG. 12 and FIG. 13.

At step 1202, a set of physical signals may be received. For example, with reference to FIG. 4, signals 400 may be received at encoder 420. At step 1204, the set of signals received at step 1202 may be mapped to a subcode of a vector signaling code. For example, the encoder 420 may map the received signals to one of the subcodes described above with reference to the four wire example. A particular subcode may thereby be selected from among multiple options based at least in part on the received signals. At step 1206, the set of signals received at step 1202 may be mapped to a code word of the subcode to which the set of signals was mapped at step 1204. For example, the encoder 420 may map the received signals to the code word of the subcode, thereby selecting the code word from among multiple options based at least in part on the received signals. Steps 1204 and 1206 may be integral, for example, steps 1204 and 1206 may be performed by a circuit module of the encoder 420 responsive to receiving the set of signals.

At step 1208, values of the code word of step 1206 may be mapped to transmission elements of the data bus. For example, the encoder 420 (FIG. 4) may map the values of the code word to the wires 445. At step 1210, an identifier of the subcode of step 1204 may be mapped to transmission elements of the data bus. For example, the encoder 420 may map the identifier of the subcode to the wires 445. Steps 1206 and 1210 may be integral. For example, signal values assigned to the transmission elements of the data bus may be based at least in part on the values of the code word of step 1206 and the identifier of the subcode of step 1204 as determined by a circuit module of the encoder 420. At step 1212, the mapped values of the code word and the identifier of the subcode may be transmitted over the data bus. For example, the driver 422 may generate voltage and/or current signals suitable for transmission across the communication bus 440 and the communication bus 440 may transmit the generated signals to the receive unit 450.

At step 1302 of FIG. 13, a set of physical signals may be received. For example, the receive unit 450 (FIG. 4) may receive the signals transmitted at step 1212 of FIG. 12. At step 1304, the set of signals received at step 1302 may be interpreted as selecting a subcode. For example, the decoder 470 may select the subcode from among multiple options based at least in part on the received set of signals. At step 1306, the set of signals received at step 1302 may be interpreted as representing a code word of the subcode identified at step 1304. For example, the decoder 470 may select the code word from among multiple options provided by the subcode based at least in part on the received set of signals. Steps 1304 and 1306 may be integral, for example, steps 1304 and 1306 may be performed by a circuit module of the decoder 470 responsive to receiving the set of signals. Steps 1304 and 1306 need not consider different and/or disjoint portions of the received set of signals.

At step 1308, the code word identified at step 1306 may be mapped to one or more data values, for example, by the decoder 470. At step 1310, the data value(s) may be output as a new set of physical signals. For example, the receive unit 450 may output the new signals and the new signals may correspond to a replication 480 of the signals 400 from the source 402.

The examples illustrate the use of vector signaling codes for point-to-point wire communications. However, this should not been seen in any way as limiting the scope of the described invention. The methods disclosed in this application are equally applicable to other communication media including optical and wireless communications. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

Interpreting a set of signals as selecting an object (e.g., a data object) can include selecting the object based at least in part on the set of signals and/or one or more attributes of the set of signals. Interpreting a set of signals as representing an object (e.g., a data object) can include determining and/or selecting the object based at least in part on a representation corresponding to the set of signals. A same set of signals may be used to select and/or determine multiple distinct objects (e.g., data objects).

We claim:

1. An apparatus comprising:
an encoder configured to map a set of information bits into a code word of a respective subcode among a plurality of subcodes that collectively comprise a vector signaling code, each subcode among the plurality of subcodes comprising multiple code words, the plurality of subcodes including a first unbalanced subcode and a second unbalanced subcode, wherein a sum of analog voltages representing the first unbalanced subcode is opposite in sign to a sum of analog voltages representing the second unbalanced subcode; and
an output driver operative to transform the code word into physical signals on multiple transmission elements of a data bus.

2. The apparatus of claim 1, wherein a collection of all code words across all subcodes in the plurality of subcodes is balanced.

3. The apparatus of claim 1, further comprising at least one compensation transmitter configured to transmit a physical signal derived from a transmission element into a dummy load for purposes of compensating for simultaneous switching noise.

4. The apparatus of claim 3, wherein the compensation transmitter is located in a pad ring of an integrated circuit.

5. The apparatus of claim 3, wherein the at least one compensation transmitter comprises a compensation circuit that observes a load that is placed on a plurality of driven circuits and adjusts parameters of the dummy load to more closely match the load that is placed on the driven circuits.

6. The apparatus of claim 1, wherein a number of code words in the vector signaling code is greater than a number of possible combinations of the set of information bits, the code words in excess of the number of possible combinations being excess code words.

7. The apparatus of claim 6, wherein mapping values of the code word includes using at least one excess code word to reduce a length of runs of a same value of a transmission element.

8. The apparatus of claim 6, wherein the encoder is configured to use at least one excess code word to improve a long-term balance of a transmission element.

9. The apparatus of claim 6, wherein the encoder is configured to use at least one excess code word to provide an error check function over the set of information bits.

10. The apparatus of claim 6, wherein the encoder is configured to use at least one excess code word to provide an additional communications channel.

11. The apparatus of claim 6, wherein the encoder is configured to use at least one excess code word to provide link-specific control signaling.

12. An apparatus comprising:
a plurality of sample circuits operative to receive an input by sampling physical signals on the transmission elements;
a first decoder configured to identify, based on the received input, a subcode from among a plurality of subcodes that collectively comprise a vector signaling code, each subcode among the plurality of subcodes comprising multiple code words, the plurality of subcodes including a first unbalanced subcode and a second unbalanced subcode, wherein a sum of analog voltages representing the first unbalanced subcode is opposite in sign to a sum of analog voltages representing the second unbalanced subcode; and
a second decoder configured to (i) identify, based on the received input, a code word within the identified subcode and to (ii) provide an output result based on the identified code word.

13. The apparatus of claim 12, wherein the first decoder is configured to evaluate an analog sum of the physical signals and to identify the subcode based on the analog sum.

14. The apparatus of claim 12, wherein the first decoder is configured to evaluate a sum of absolute values of differences between the physical signals and to identify the subcode based on the sum.

15. The apparatus of claim 12, wherein the first decoder is configured to identify the physical signals with the lowest signal difference and to identify the subcode based on the identification of the physical signals with the lowest signal difference.

16. The apparatus of claim 12, wherein the first decoder is configured to produce a subcode discriminator result, and the second decoder is operative to provide a maximum likelihood assessment of the values of the received input and the subcode discriminator result.

17. The apparatus of claim 13, wherein identifying the subcode comprises comparing the analog sum of the physical signals with a fixed reference.

18. The apparatus of claim 13, wherein identifying the subcode comprises comparing the analog sum of the physical signals with a time-average of the analog sum.

19. The apparatus of claim 13, wherein identifying the subcode comprises comparing the analog sum of the physical signals with a stored value of at least one known input signal at a previous time.

20. The apparatus of claim 13, wherein identifying the subcode comprises comparing an average of the physical signals with a stored value of at least one known input signal at a previous time.

* * * * *